United States Patent
Takagi et al.

(10) Patent No.: US 11,808,607 B2
(45) Date of Patent: *Nov. 7, 2023

(54) RANGING APPARATUS AND MOVING OBJECT CAPABLE OF HIGH-ACCURACY RANGING

(71) Applicant: CANON KABUSHIKI KAISHA, Tokyo (JP)

(72) Inventors: Akinari Takagi, Yokosuka (JP); Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 16/876,270

(22) Filed: May 18, 2020

(65) Prior Publication Data

US 2020/0278202 A1 Sep. 3, 2020

Related U.S. Application Data

(63) Continuation of application No. 15/450,321, filed on Mar. 6, 2017, now Pat. No. 10,690,495.

(30) Foreign Application Priority Data

| Mar. 14, 2016 | (JP) | 2016-050237 |
| Feb. 22, 2017 | (JP) | 2017-031363 |

(51) Int. Cl.
*G01C 3/08* (2006.01)
*G06V 20/58* (2022.01)

(52) U.S. Cl.
CPC ............ *G01C 3/085* (2013.01); *G06V 20/58* (2022.01)

(58) Field of Classification Search
CPC .................................................... G06V 20/58
See application file for complete search history.

(56) References Cited

U.S. PATENT DOCUMENTS

| 6,587,183 B1 * | 7/2003 | Uomori | G06T 7/521 |
| | | | 348/E5.058 |
| 7,587,118 B2 | 9/2009 | Nobayashi et al. | |

(Continued)

FOREIGN PATENT DOCUMENTS

| JP | H11-037752 A | 2/1992 |
| JP | 2013-190622 A | 9/2013 |

OTHER PUBLICATIONS

Aug. 3, 2021 Japanese Official Action in Japanese Patent Appln. No. 2017-031363.

*Primary Examiner* — Md K Talukder

(74) *Attorney, Agent, or Firm* — Venable LLP

(57) ABSTRACT

A ranging apparatus capable of suppressing reduction of ranging accuracy at a long distance end of a distance measurement range, thereby making it possible to perform high-accuracy ranging over a wide distance range. An image pickup device receives light fluxes from a fixed focus optical system. A distance information acquisition unit acquires distance information of an object based on image signals from the image pickup device. This section acquires the distance information based on parallax between a first image based on a light flux having passed a first region of an exit pupil, and a second image based on a light flux having passed a second region of the exit pupil. The optical system is configured such that parallax of an object existing at a predetermined distance is smaller than parallax of an object existing at a shorter distance than the predetermined distance.

25 Claims, 12 Drawing Sheets

(56) References Cited

U.S. PATENT DOCUMENTS

| | | | |
|---|---|---|---|
| 8,472,032 B2* | 6/2013 | Gharib | G06T 7/50 |
| | | | 356/601 |
| 8,675,291 B2* | 3/2014 | Rohaly | H04N 13/218 |
| | | | 359/740 |
| 9,278,546 B2 | 3/2016 | Nobayashi | |
| 9,456,119 B2 | 9/2016 | Hamano | |
| 9,562,993 B2 | 2/2017 | Takagi | |
| 9,684,954 B2* | 6/2017 | Inoue | G06T 5/005 |
| 9,964,405 B2* | 5/2018 | Maalouf | G01C 3/08 |
| 10,690,495 B2* | 6/2020 | Takagi | G01C 3/085 |
| 2005/0073577 A1* | 4/2005 | Sudo | H04N 13/305 |
| | | | 348/42 |
| 2008/0018732 A1* | 1/2008 | Moller | H04N 13/363 |
| | | | 348/E13.058 |
| 2008/0019567 A1* | 1/2008 | Takagi | G06V 20/58 |
| | | | 382/103 |
| 2008/0212838 A1* | 9/2008 | Frigerio | G06V 10/147 |
| | | | 382/107 |
| 2010/0053414 A1* | 3/2010 | Tamaki | G02B 7/02 |
| | | | 156/60 |
| 2010/0182484 A1* | 7/2010 | Iijima | H01L 27/14627 |
| | | | 348/340 |
| 2011/0267508 A1* | 11/2011 | Kane | G06T 7/529 |
| | | | 348/241 |
| 2012/0057000 A1* | 3/2012 | Rohaly | H04N 13/218 |
| | | | 348/E13.074 |
| 2012/0075511 A1* | 3/2012 | Tay | H04N 25/134 |
| | | | 348/E9.005 |
| 2013/0188019 A1* | 7/2013 | Christopher | H04N 13/236 |
| | | | 348/46 |
| 2013/0194387 A1* | 8/2013 | Hatakeyama | H04N 13/20 |
| | | | 348/46 |
| 2013/0265562 A1* | 10/2013 | Tang | G01S 7/4813 |
| | | | 356/4.01 |
| 2015/0092988 A1 | 4/2015 | Mitoma et al. | |
| 2015/0287208 A1* | 10/2015 | Hiasa | H04N 13/111 |
| | | | 382/154 |
| 2016/0035099 A1* | 2/2016 | Kawamura | H04N 25/134 |
| | | | 382/103 |
| 2016/0252619 A1* | 9/2016 | Markendorf | G01S 17/86 |
| | | | 356/3.01 |
| 2016/0261842 A1* | 9/2016 | Eguchi | H04N 23/80 |
| 2017/0261318 A1* | 9/2017 | Takagi | G06V 20/58 |
| 2020/0278202 A1* | 9/2020 | Takagi | G06V 20/58 |
| 2021/0190485 A1* | 6/2021 | Takagi | G02B 7/34 |

* cited by examiner

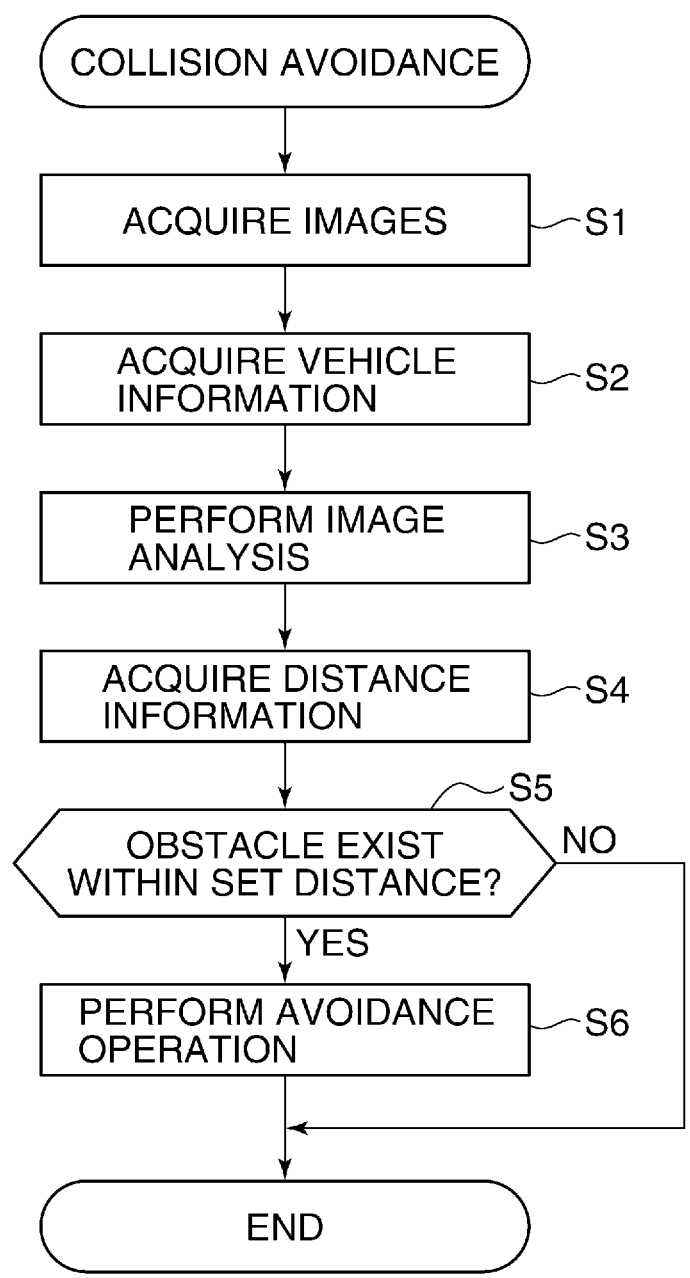

RANGING APPARATUS AND MOVING OBJECT CAPABLE OF HIGH-ACCURACY RANGING

This application is a continuation of application Ser. No. 15/450,321 filed Mar. 6, 2017.

BACKGROUND OF THE INVENTION

Field of the Invention

The present invention relates to a ranging apparatus and a moving object, and more particularly to a ranging apparatus and a moving object which are capable of performing high-accuracy ranging by an imaging plane phase difference method.

Description of the Related Art

To assist the movement of a moving object, such as a vehicle, a drone, or a robot, it is required to measure a distance between a moving object, and an object, such as an obstacle, around the moving object. Particularly, to assist the movement of the moving object e.g. for avoiding collision or for tracking another object, it is also required to perform recognition processing using images of an obstacle, and hence, a camera as an image pickup apparatus is often used in the moving object, for measuring a distance to the obstacle. As a method of acquiring not only images but also distances using a camera, there has been known an imaging plane phase difference method (Japanese Laid-Open Patent Publication (Kokai) No. 2013-190622). In the imaging plane phase difference method, parallax between a pair of images formed by light fluxes having passed through two different regions (partial pupils) of an exit pupil of an optical system of the camera is determined, and distance information (phase difference of image signals) of an object is measured from the parallax based on the principle of the triangulation. In the camera using the imaging plane phase difference method, each pixel of an image pickup device has two photoelectric conversion sections (photodiodes), for example. In the imaging plane phase difference method, while parallax between a pair of images is determined from electric signals (hereinafter referred to as "image signals") converted from images (optical images) formed by light fluxes entering the respective photoelectric conversion sections, an object image is acquired by adding up the image signals of the photoelectric conversion sections.

On the other hand, in a case where the camera is applied to a moving object, downsizing and durability of the camera are required, and hence normally, the camera is not provided with an auto focus function, but focus of the camera is fixed, whereby an in-focus position is set in the center of a measurable distance range (hereinafter referred to as a "distance measurement range").

However, since in the triangulation, the accuracy of measurement of distance (hereinafter referred to as the "ranging accuracy") is reduced in proportion to approximately the square of a distance to an object, there is a fear that the ranging accuracy is lowered at a long distance end of the distance measurement range.

SUMMARY OF THE INVENTION

The present invention provides a ranging apparatus and a moving object which are capable of suppressing the reduction of ranging accuracy at a long distance end of a distance measurement range, thereby making it possible to perform high-accuracy ranging over a wide distance range.

In a first aspect of the present invention, there is provided an ranging apparatus comprising an optical system that is a fixed focus optical system, an image pickup device that receives light fluxes from the optical system, and a distance information acquisition unit that is configured to acquire distance information based on image signals from the image pickup device, wherein the distance information acquisition unit acquires the distance information on a object, based on parallax between a first image based on a light flux from an object, having passed through a first region of an exit pupil of the optical system, and a second image based on a light flux from the object, having passed through a second region of the exit pupil, and wherein the optical system is configured such that the parallax of an object existing at a distance of 100 m from the ranging apparatus is smaller than the parallax of an object existing at a distance of 1 m from the ranging apparatus.

In a second aspect of the present invention, there is provided a ranging apparatus comprising an optical system that is a fixed focus optical system, an image pickup device that receives light fluxes from the optical system, and a distance information acquisition unit that is configured to acquire distance information based on image signals from the image pickup device, wherein the distance information acquisition unit acquires the distance information on a object, based on parallax between a first image based on a light flux from an object, having passed through a first region of an exit pupil of the optical system, and a second image based on a light flux from the object, having passed through a second region of the exit pupil, and wherein the optical system is configured such that the parallax of an object existing at a long distance end of a distance measurement range of the ranging apparatus is smaller than the parallax of an object existing at a short distance end of the distance measurement range of the ranging apparatus.

In a third aspect of the present invention, there is provided a moving object including a ranging apparatus, and a controller that controls the moving object based on a result of ranging by the ranging apparatus, wherein the ranging apparatus comprises an optical system that is a fixed focus optical system, an image pickup device that receives light fluxes from the optical system, and a distance information acquisition unit that is configured to acquire distance information based on image signals from the image pickup device, wherein the distance information acquisition unit acquires the distance information on a object, based on parallax between a first image based on a light flux from an object, having passed through a first region of an exit pupil of the optical system, and a second image based on a light flux from the object, having passed through a second region of the exit pupil, and wherein the optical system is configured such that the parallax of an object existing at a long distance end of a distance measurement range of the ranging apparatus is smaller than the parallax of an object existing at a short distance end of the distance measurement range of the ranging apparatus.

According to the present invention, it is possible to suppress the reduction of ranging accuracy at the long distance end of the distance measurement range, thereby making it possible to perform high-accuracy ranging over a wide distance range.

Further features of the present invention will become apparent from the following description of exemplary embodiments (with reference to the attached drawings).

BRIEF DESCRIPTION OF THE DRAWINGS

FIG. 13 is a flowchart of a collision avoidance process performed by the driving assistance system for the automotive vehicle as the moving object according to the second embodiment.

DESCRIPTION OF THE EMBODIMENTS

The present invention will now be described in detail below with reference to the accompanying drawings showing embodiments thereof. The component elements described in the embodiment are only described by way of example, and are by no means intended to limit the scope of the present invention to them alone.

Figure 1:
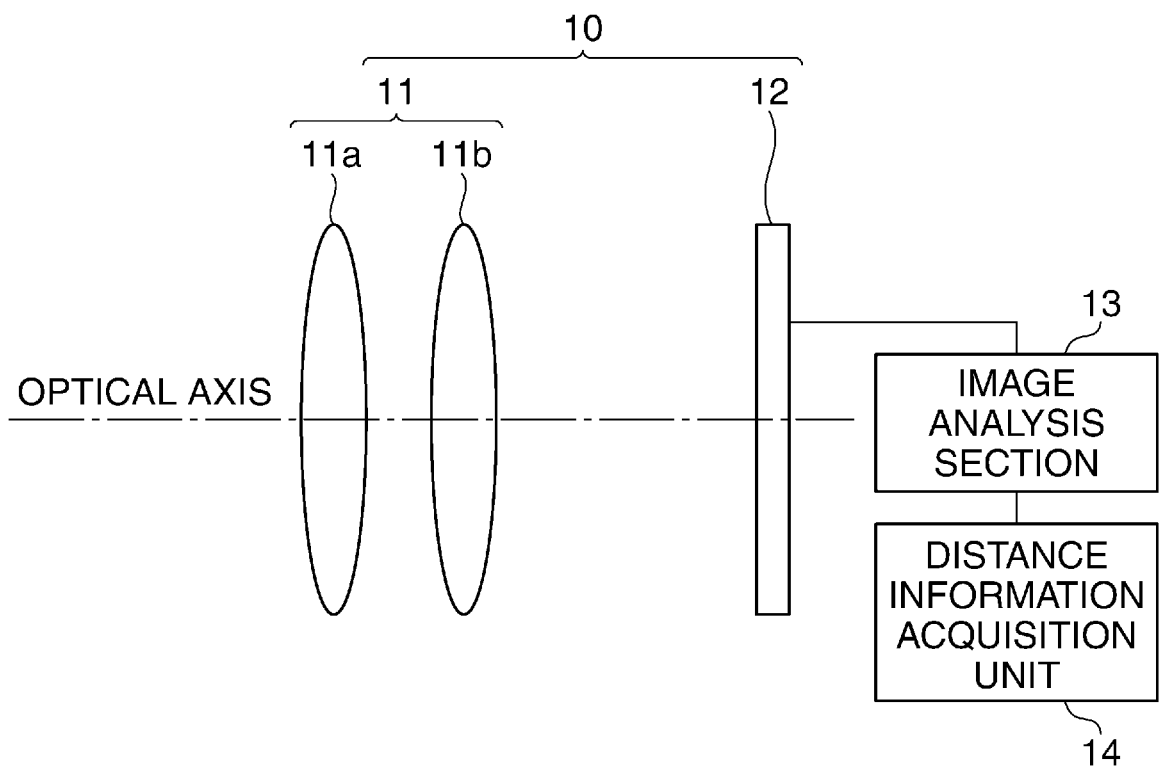
FIG. 1 is a schematic block diagram of a ranging apparatus according to a first embodiment of the present invention.

First, a description will be given of a first embodiment of the present invention. FIG. 1 is a schematic block diagram of a ranging apparatus according to an embodiment of the present invention.

Figure 2:
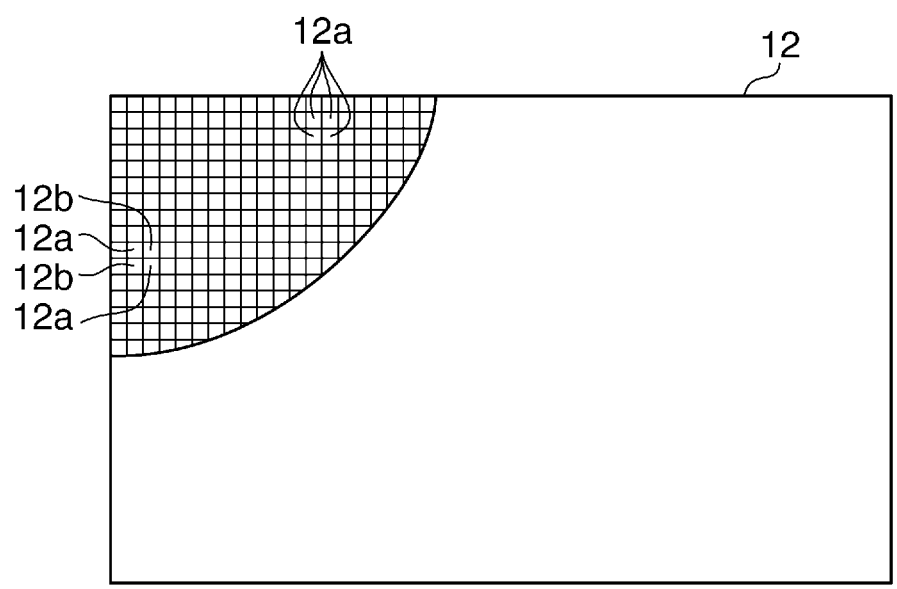
FIG. 2 is a schematic front view of an image pickup device appearing in FIG. 1.

Referring to FIG. 1, the ranging apparatus is comprised of a camera 10 which includes an optical system 11 as a fixed focus optical system and an image pickup device 12 having a large number of pixels arranged therein, an image analysis section 13, and a distance information acquisition section 14. The optical system 11 includes, for example, two lenses 11a and 11b arranged along the optical axis, and forms an image of an object on the image pickup device 12. AS shown in FIG. 2, the plurality of pixels included in the image pickup device 12 are classified into a plurality of image pickup pixels 12a and a plurality of ranging pixels 12b. Note that in FIG. 2, to eliminate troublesomeness, only how a plurality of pixels are arranged at an upper left portion of the image pickup device 12 is shown, thereby omitting illustration of the arrangement of all pixels on the whole surface of the image pickup device 12. Each of the image pickup pixels 12a and the ranging pixels 12b includes a photoelectric conversion element, such as a photodiode (hereinafter referred to as the "PD"), as a photoelectric conversion portion. Each image pickup pixel 12a receives a light flux having passed through a partial area of an exit pupil of the optical system 11 (hereinafter referred to as a "partial pupil"), and forms an image signal of the object. Further, each ranging pixel 12b receives one of light fluxes having passed through two different ranging partial pupils of the exit pupil of the optical system 11. In the image pickup device 12, for example, according to a Bayer array, the image pickup pixels 12a having a spectral sensitivity to G (green) are arranged as two pixels, diagonally opposite to each other, of four pixels in two rows and two columns, and the image pickup pixels 12a having spectral sensitivities to R (red) and B (blue), respectively, are arranged as the other two pixels of the four pixels. The spectral sensitivities to specific colors, which the respective image pickup pixels 12a have, are added by primary color filters provided in the respective image pickup pixels 12a. Further, in the image pickup device 12, in some of the pixels in two rows and two columns, the two image pickup pixels 12a diagonally opposite to each other and having the spectral sensitivity to G are left as they are, and the image pickup pixels 12a having the spectral sensitivities to R and B are replaced by the ranging pixels 12b. In the image pickup device 12, in some of the pixels in two rows and two columns, the two ranging pixels 12b diagonally opposite to each other receive light fluxes having passed through the ranging partial pupils, respectively, to thereby output a pair of image signals of the object. The image analysis section 13 performs image processing on the output image signals, and further, analyzes the image signals to thereby acquire feature information on the object contained in the images. The distance information acquisition section 14 calculates parallax between a pair of images from the image signals subjected to the image processing, and further, calculates a distance to the object based on the calculated parallax. That is, the ranging apparatus measures distance information of the object by an imaging plane phase difference method. Note that in the present specification, hereinafter, the distance information of the object is defined as information on a position of the object, such as the distance to the object, a defocus amount, and parallax (an image shift amount and a phase difference). To calculate the parallax between the pair of images from the image signals, it is not necessarily required to perform the image processing on the image signals output from the image pickup device 12. For example, the image pickup device 12 may output the image signals to the distance information acquisition section 14 without via the image analysis section 13, and the distance information acquisition section 14 may generate the distance information from the image signals.

Although in the above-described image pickup device 12, the two ranging pixels 12b receive light fluxes having passed through the ranging partial pupils, respectively, to form a pair of image signals, one imaging and ranging pixel 12c, described hereinafter, may receive the light fluxes having passed through the ranging partial pupils, respectively, to form a pair of image signals. In this case, the imaging and ranging pixel 12c includes at least two PDs, and the PDs receive the light fluxes having passed through the ranging partial pupils, respectively. Further, the imaging and ranging pixel 12c combines the light fluxes received by the PDs after having passed through the ranging partial pupils to form an image signal of the object. Therefore, the imaging and ranging pixels 12c may be arranged in almost the whole area of the image pickup device 12. Note that in the present embodiment, the lenses 11a and 11b of the optical system 11 of the camera 10 are fixed, and a so-called auto focus function is omitted.

Figure 3A:
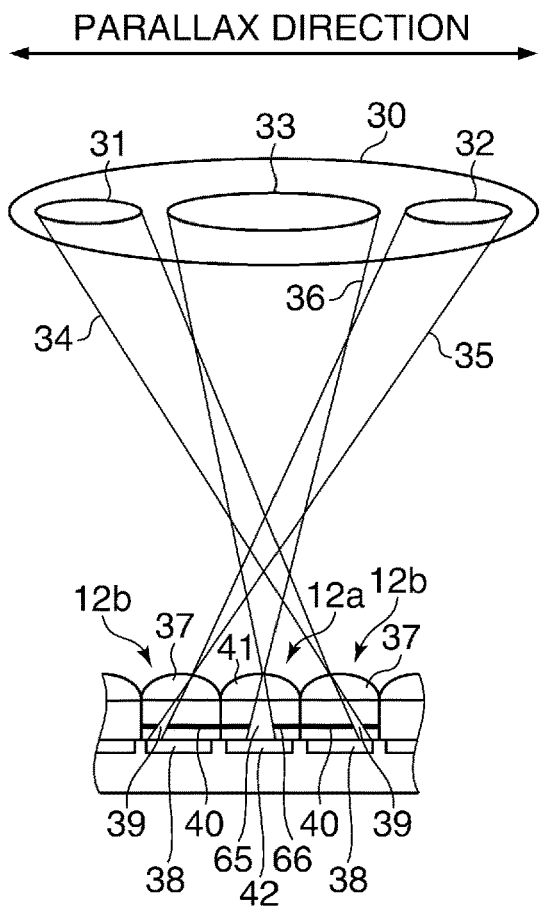
FIGS. 3A to 3C are diagrams useful in explaining the principle of distance measurement (ranging) by an imaging plane phase difference method.
Figure 3B:
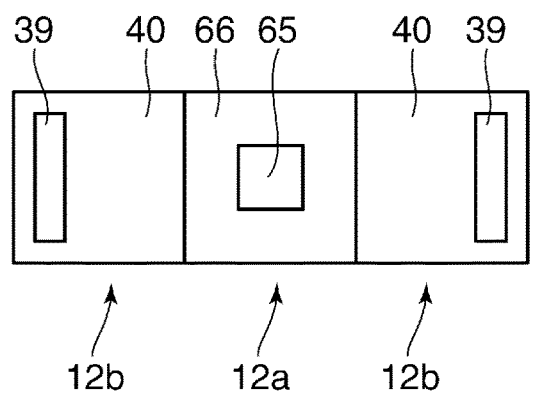
Figure 3C:
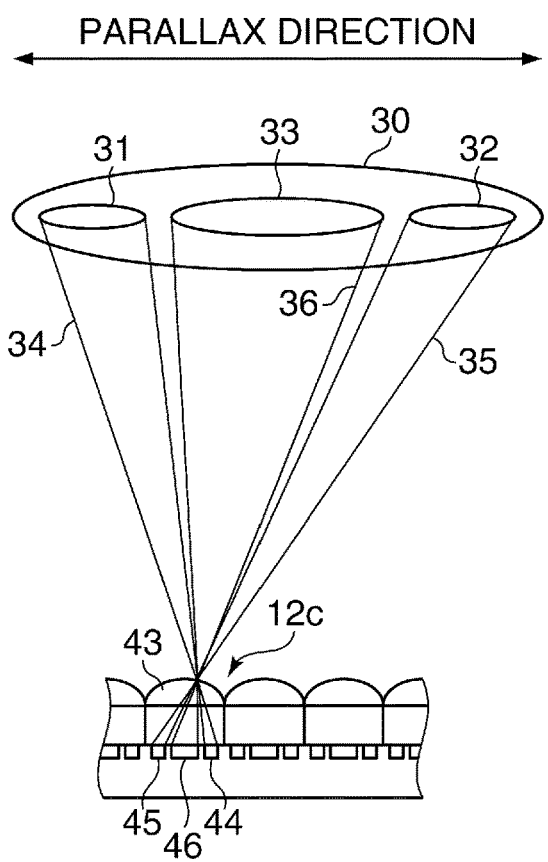

FIGS. 3A to 3C are diagrams useful in explaining the principle of distance measurement (ranging) by the imaging plane phase difference method. More specifically, FIG. 3A shows a case where the distance measurement is performed using image signals respectively formed by a pair of the two ranging pixels 12b. FIG. 3B shows a plurality of pixels appearing in FIG. 3A as viewed from the direction of the optical axis. FIG. 3C shows a case where the distance measurement is performed using a pair of image signals formed by the one imaging and ranging pixel 12c. Note that in FIGS. 3A to 3C, the image pickup pixel 12a, each ranging pixel 12b, and the imaging and ranging pixel 12c are illustrated in a state as viewed from a side.

First, in FIG. 3A, the exit pupil 30 of the optical system 11 includes two ranging partial pupils (hereinafter referred to as the "ranging pupils") 31 and 32 (a first region and a second region) which are positioned close to opposite ends of the exit pupil 30 in a horizontal direction (lateral direction as viewed in FIG. 3A, hereinafter referred to as the "parallax direction"), respectively. Further, the exit pupil 30 includes an image pickup partial pupil (hereinafter referred to as the "image pickup pupil") 33 (a third region) which is positioned in a substantially central portion of the exit pupil 30 in the parallax direction so as to be sandwiched between the ranging pupils 31 and 32. Ranging light fluxes 34 and 35 are emitted from the respective ranging pupils 31 and 32, and enter the pair of the ranging pixels 12b, respectively. Further, an image pickup light flux 36 is emitted from the image pickup pupil 33, and enters the image pickup pixel 12a. Each ranging pixel 12b includes a micro lens 37 and a PD 38 opposed to the exit pupil 30 via the micro lens 37. Furthermore, each ranging pixel 12b includes a light shielding film 40 that is arranged between the micro lens 37 and the PD 38, and has an opening 39 to cause the PD 38 to partially face the micro lens 37. Further, the image pickup pixel 12a includes a micro lens 41 and a PD 42 opposed to the exit pupil 30 via the micro lens 41. Furthermore, the image pickup pixel 12a includes a light shielding film 66 that is arranged between the micro lens 41 and the PD 42, and has an opening 65 to cause the PD 42 to partially face the micro lens 41.

In the pair of the ranging pixels 12b, the micro lenses 37 are disposed close to the image surface of the optical system 11, and condense the ranging light fluxes 34 and 35 onto associated ones of the light shielding films 40 (associated ones of the openings 39), respectively. The optical system 11 and each micro lens 37 are configured such that the exit pupil 30 and the associated light shielding film 40 (the associated opening 39) are optically conjugate to each other. Therefore, the micro lenses 37 cause the shapes of the openings 39 of the respective light shielding films 40 to be projected onto the ranging pupils 31 and 32 of the exit pupil 30. That is, the arrangements (positions and sizes (areas)) of the ranging pupils 31 and 32 are defined by the positions and sizes of the openings 39 of the light shielding films 40 associated therewith. Further, in the image pickup pixel 12a, the micro lens 41 is disposed close to the image surface of the optical system 11, and condenses the image pickup light flux 36 onto the light shielding film 66 (the opening 65). Further, in the image pickup pixel 12a, the optical system 11 and the micro lens 41 are configured such that the exit pupil 30 and the light shielding film 66 (the opening 65) are optically conjugate to each other. Therefore, the micro lens 41 causes the shape of the opening 65 to be projected onto the image pickup pupil 33 of the exit pupil 30. That is, the arrangement (position and size (area)) of the image pickup pupil 33 is defined by the position and size of the opening 65 of the light shielding film 66. The PDs 38 of the pair of the ranging pixels 12b output image signals obtained by photoelectrically converting images formed from the ranging light fluxes 34 and 35 having passed through the ranging pupils 31 and 32, by the respective micro lenses 37, respectively. In the present embodiment, the parallax between a pair of images (hereinafter referred to as the "first image" and the "second image", respectively) is calculated by performing image shift detection arithmetic processing (correlation processing and phase difference detection processing) and the like on the output image signals from the PDs 38. Further, a defocus amount of the object and a distance thereto are calculated from the parallax based on the principle of the triangulation (see e.g. US Patent Application Publication No. 2015/0092988). Further, the PD 42 of the image pickup pixel 12a outputs an image signal obtained by photoelectrically converting an image formed from the image pickup light flux 36 having passed through the image pickup pupil 33 by the micro lens 41, and a picked-up image (hereinafter also referred to as the "third image") of the object is formed from the image signal. Although in FIGS. 3A and 3B, the light shielding films 40 and the light shielding film 66 are provided, these light shielding films may be omitted. In this case, by making the positions and sizes of the PDs 38 and the PD 42 the same as the positions and sizes of the openings 39 and the opening 65, it is possible to define the above-described arrangements of the ranging pupils 31 and 32 and the image pickup pupil 33.

Further, in FIG. 3C, the ranging light fluxes 34 and 35 are emitted from the respective ranging pupils 31 and 32, and enter the imaging and ranging pixel 12c. The image pickup light flux 36 is emitted from the image pickup pupil 33, and enters the imaging and ranging pixel 12c. The imaging and ranging pixel 12c includes a micro lens 43, and PDs 44 to 46 opposed to the exit pupil 30 via the micro lens 43. In the imaging and ranging pixel 12c, the micro lens 43 is disposed close to the image surface of the optical system 11. The micro lens 43 condenses the ranging light fluxes 34 and 35 and the image pickup light flux 36 onto the PDs 44 to 46, respectively. The optical system 11 and the micro lens 43 are configured such that the exit pupil 30 and the PDs 44 to 46 are optically conjugate to each other. Therefore, the micro lens 43 causes the shape of the PD 44 to be projected onto the ranging pupil 31 of the exit pupil 30. Further, the micro lens 43 causes the shape of the PD 45 to be projected onto the ranging pupil 32 of the exit pupil 30. Furthermore, the micro lens 43 causes the shape of the PD 46 to be projected onto the image pickup pupil 33 of the exit pupil 30. That is, the arrangements (positions and sizes) of the ranging pupils 31 and 32 and the image pickup pupil 33 are defined by the positions and sizes of the PDs 44 to 46. The PDs 44 and 45 of the imaging and ranging pixel 12c output image signals obtained by photoelectrically converting images formed from the ranging light fluxes 34 and 35 having passed through the ranging pupils 31 and 32, by the micro lens 43, respectively. Similar to the case of the PDs 38 of the pair of the ranging pixels 12b, the parallax between a pair of images (first and second images) is calculated by performing the image shift detection arithmetic processing (correlation processing and phase difference detection processing) on the output image signals from the PDs 44 and 45. Further, a defocus amount of the object and a distance thereto are calculated from the parallax based on the principle of the triangulation. Further, the PD 46 of the imaging and ranging pixel 12c outputs an image signal obtained by photoelectrically converting an image formed from the image pickup light flux 36 having passed through the image pickup pupil 33 by the micro lens 43, and an image (third image) of the object is formed from the image signal.

Figure 4A:
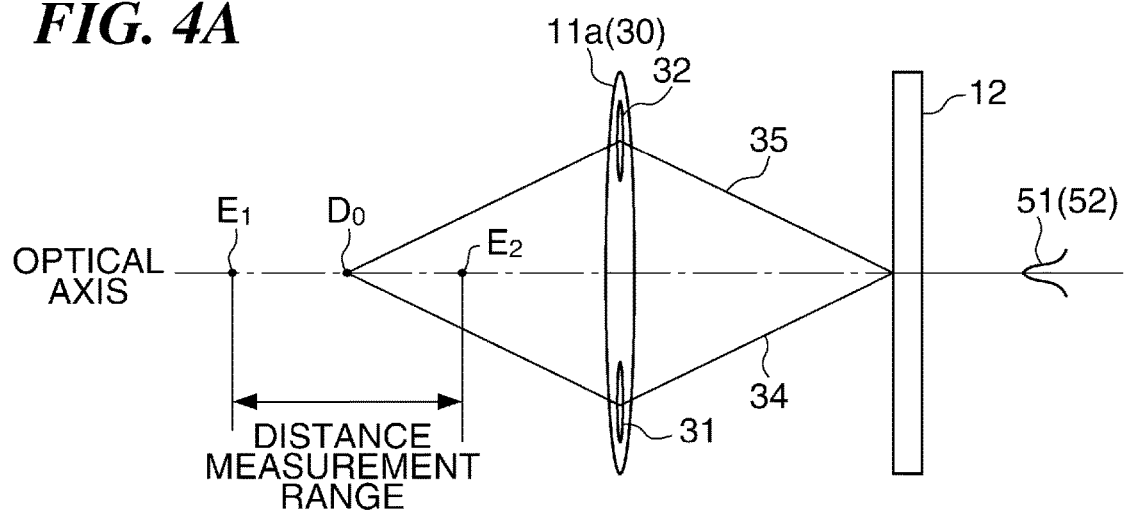
FIGS. 4A to 4C are diagrams useful in explaining the ranging accuracy of the ranging apparatus using the imaging plane phase difference method.
Figure 4B:
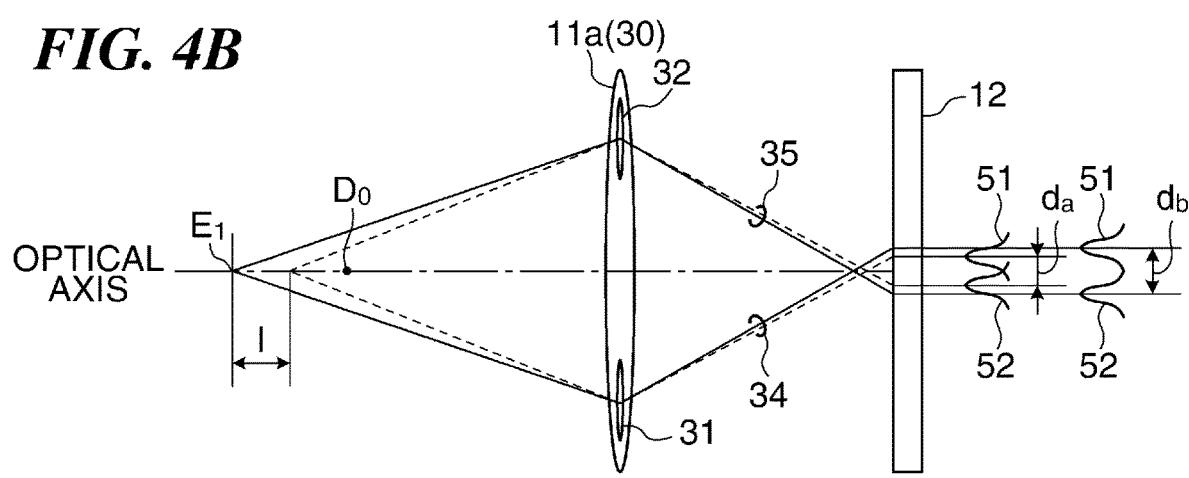
Figure 4C:
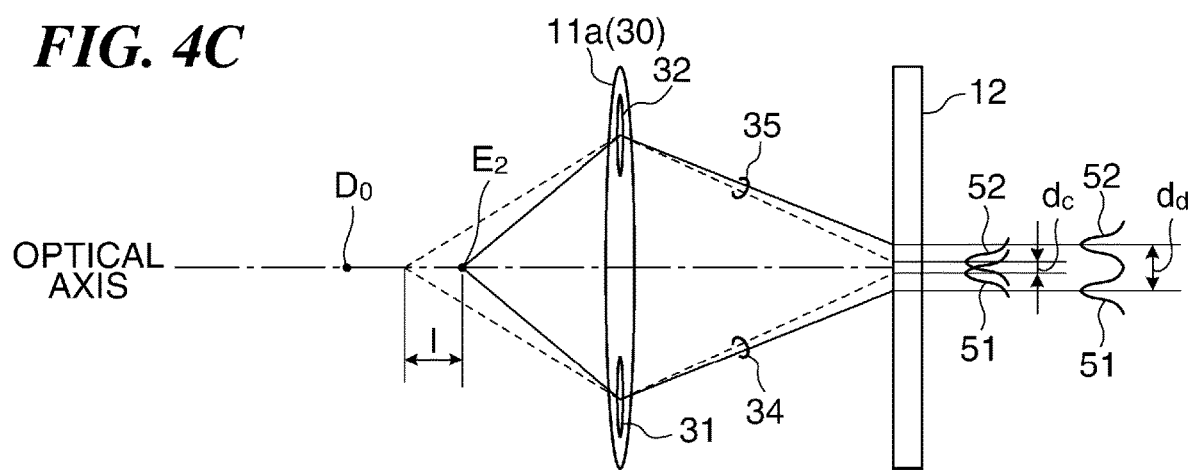

FIGS. 4A to 4C are diagrams useful in explaining the ranging accuracy of the ranging apparatus using the imaging plane phase difference method. In FIGS. 4A to 4C, only centerlines of the ranging light fluxes 34 and 35 having passed through the respective ranging pupils 31 and 32 are drawn for clarity. Further, only the lens 11a is drawn as a representative of the optical system 11, and it is assumed for convenience's sake that the whole surface of the lens 11a forms the exit pupil 30.

Normally, in the ranging apparatus that includes the fixed focus optical system without the auto focus function, a range of distance measurement is set in advance. Conventionally, the optical system 11 is configured such that a position at which the parallax between a pair of images formed from the respective ranging light fluxes 34 and 35 becomes 0 (hereinafter referred to as the "parallax 0 position $D_0$") is located about a midpoint between a long distance end $E_1$ and a short distance end $E_2$ of the distance measurement range (FIG. 4A). Specifically, the optical system 11 is configured such that the parallax 0 position D is located slightly toward the short distance end E2 from the midpoint. That is, to use a picked-up image for recognition processing, it is desirable that the amount of blur of the picked-up image is small within the distance measurement range, and hence an in-focus position is fixed such that image blur sizes at the opposite ends of the distance measurement range are equal to each other. At this time, an image 51 of the object, formed from the ranging light flux 34 at the parallax 0 position $D_0$, and an image 52 of the object, formed from the ranging light flux 35 at the parallax 0 position $D_0$ coincide with each other. Note that in FIG. 4A, the image 51 and the image 52 are each shown as an intensity distribution with respect to incident angles. In this ranging apparatus, a distance from the lens 11a to the parallax 0 position $D_0$ is also set in advance, and a distance from the lens 11a to the object (distance information) is acquired based on the distance to the parallax 0 position $D_0$, and the parallax between the pair of image signals of the object, using the principle of the triangulation.

Here, on a side closer to the long distance end $E_1$ than the parallax 0 position $D_0$ (hereinafter simply referred to as the "long distance end $E_1$ side"), when the object has moved toward the long distance end $E_1$ by a distance I (for clarity, it is illustrated such that the object is moved to the long distance end $E_1$), as shown in FIG. 4B, a difference (parallax) between the center of gravity of the image 51 and the center of gravity of the image 52 is changed from $d_a$ to $d_b$. On the other hand, on a side closer to the short distance end $E_2$ than the parallax 0 position $D_0$ (hereinafter simply referred to as the "short distance end $E_2$ side"), when the object has moved toward the short distance end $E_2$ by the distance I (for clarity, it is illustrated such that the object is moved to the short distance end $E_2$), as shown in FIG. 4C, the parallax is changed from $d_c$ to $d_d$. Here, in a case where the object has moved by the same distance I, the amount of change in the incident angles of the ranging light fluxes 34 and 35 on the long distance end $E_1$ side is smaller than the amount of change in the incident angles of the ranging light fluxes 34 and 35 on the short distance end $E_2$ side. Therefore, in the case where the object has moved by the same distance I, the amount $|d_a-d_b|$ of change in the parallax on the long distance end $E_1$ side is smaller than the amount $|d_c-d_d|$ of change in the parallax on the short distance end $E_2$ side. That is, on the long distance end $E_1$ side, the amount of change in the parallax is smaller even when the object has moved, so that the ranging accuracy becomes lower than on the short distance end $E_2$ side in the imaging plane phase difference method using the principle of the triangulation. In a generalized expression, the amount of change in the parallax is proportional to the reciprocal of approximately the square of the distance from the lens 11a to the object. In other words, as the distance from the lens 11a to the object is larger, the amount of change in the parallax becomes smaller, and the ranging accuracy becomes lower in the imaging plane phase difference method using the principle of the triangulation. In the present embodiment, to cope with this, the parallax 0 position $D_0$ is displaced toward the long distance end $E_1$.

Figure 5A:
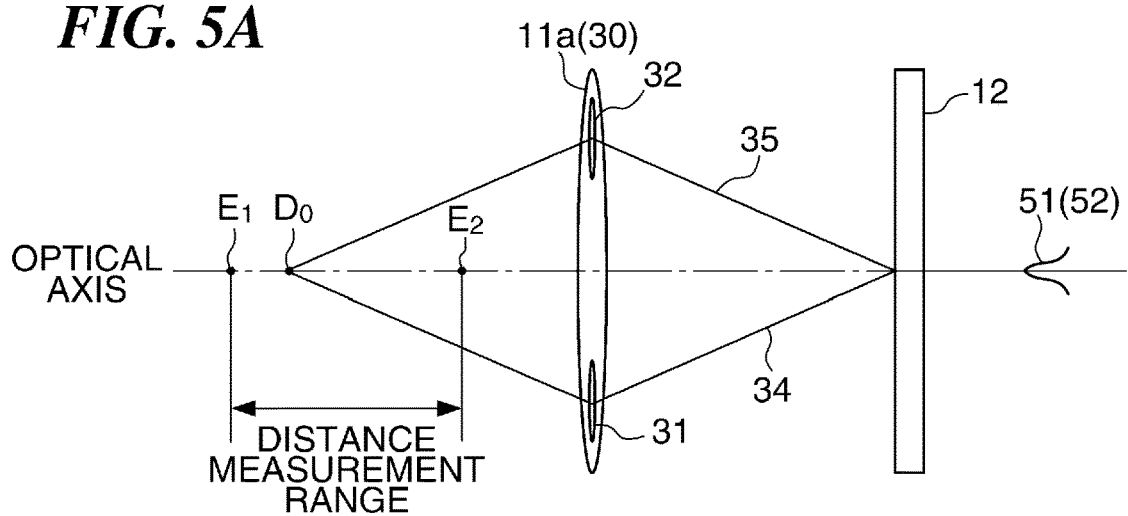
FIGS. 5A to 5C are diagrams useful in explaining the relationship between a parallax 0 position and a distance measurement range in the first embodiment.
Figure 5B:
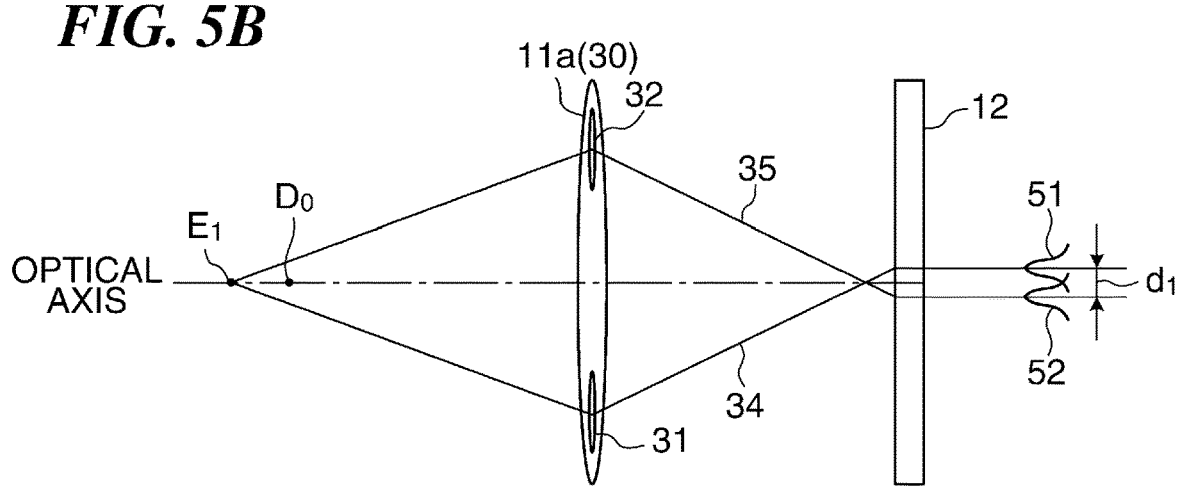
Figure 5C:
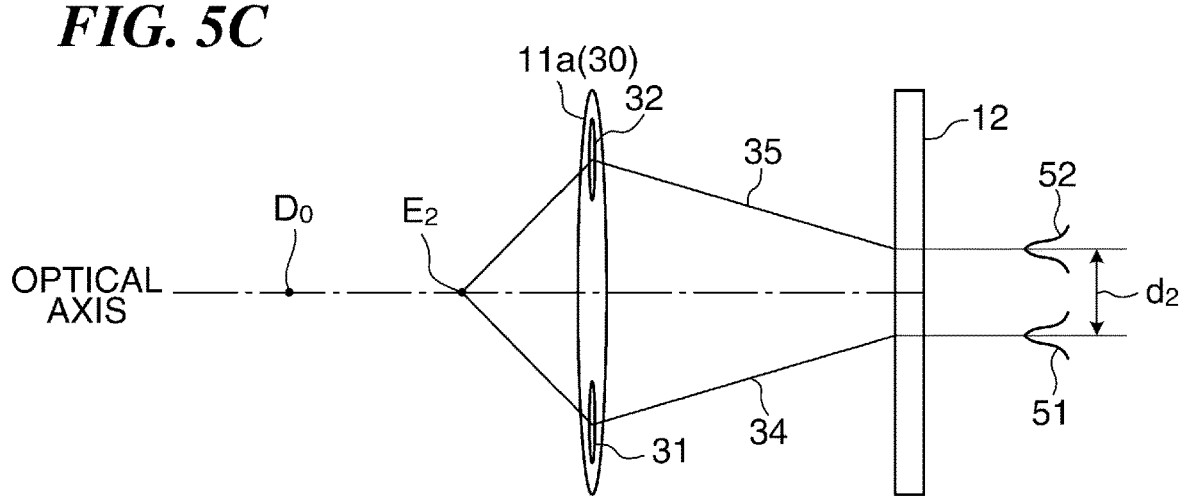

FIGS. 5A to 5C are diagrams useful in explaining the relationship between the parallax 0 position and the distance measurement range in the present embodiment. Also in FIGS. 5A to 5C, only the centerlines of the ranging light fluxes 34 and 35 having passed through the respective ranging pupils 31 and 32 are drawn for clarity. Further, only the lens 11a is drawn as a representative of the optical system 11, and it is assumed for convenience's sake that the whole surface of the lens 11a forms the exit pupil 30.

In the ranging apparatus according to the present embodiment, the long distance end $E_1$ is set e.g. 100 meters or 50 meters away from the lens 11a, and the short distance end $E_2$ is set e.g. 1 meter or 2 meters away from the lens 11a. Further, in the ranging apparatus, the optical system 11 is configured such that the parallax 0 position $D_0$ is located a position shifted toward the long distance end $E_1$ (FIG. 5A). This makes it possible to define the distance measurement range such that the long distance end $E_1$ side where the ranging accuracy is lowered is made shorter than the short distance end $E_2$ side. That is, it is possible to reduce a range where the ranging accuracy is lowered, and hence it is possible to improve average reliability of the ranging accuracy in the whole distance measurement range.

Further, in general, in the triangulation, when an object moves away from the parallax 0 position $D_0$, an image of the object is blurred to reduce signal intensity of an image signal of the object in the image pickup device 12, and further, the image itself of the object is deformed, which makes it difficult to determine the center of gravity of the image of the object. As a consequence, the ranging accuracy is lowered. On the other hand, when the object exists close to the parallax 0 position Do, the image of the object is difficult to be blurred, whereby the signal intensity of the image signal of the object is not reduced, and also the image of the object is difficult to be deformed, which makes it easy to determine the center of gravity of the image of the object. As a consequence, the ranging accuracy is improved. In the present embodiment, since the parallax 0 position $D_0$ is located at a position shifted toward the long distance end $E_1$, the distance from the parallax 0 position $D_0$ to the long distance end $E_1$ of the distance measurement range becomes relatively shorter, and it is difficult for the object to move away on the long distance end $E_1$ side from the parallax 0 position $D_0$. As a consequence, it is possible to prevent the ranging accuracy from being lowered on the long distance end $E_1$ side.

On the other hand, in the present embodiment, the distance from the parallax 0 position $D_0$ to the short distance end $E_2$ becomes relatively longer, and it is easy for the object to move away on the short distance end $E_2$ side from the parallax 0 position $D_0$, and hence there is a fear of lowering of the ranging accuracy at the short distance end $E_2$. However, as described hereinabove, the ranging accuracy is lowered as the distance from the lens 11a to the object is increased. In other words, the ranging accuracy is improved as the distance from the lens 11a to the object is reduced. Therefore, in the present embodiment, on the short distance end $E_2$ side, the lowering of the ranging accuracy due to the object moving away from the parallax 0 position $D_0$ is compensated for by the improvement in the ranging accuracy due to the reduction of the distance from the lens 11a to the object. This makes it possible to prevent the ranging accuracy from being lowered on the short distance end $E_2$ side.

In the present embodiment, as described above, since the parallax 0 position $D_0$ is located at the location shifted toward the long distance end $E_1$, parallax $d_1$ (FIG. 5B) in a case where the object exists at the long distance end $E_1$ becomes shorter than parallax $d_2$ (FIG. 5C) in a case where the object exists at the short distance end $E_2$. At this time, if the parallax 0 position $D_0$ is set such that the parallax $d_2$ becomes 1.2 or more times larger than the parallax $d_1$, it is possible to suppress lowering of the ranging accuracy without being affected by manufacturing errors and the like. In particular, by setting the parallax 0 position $D_0$ such that the parallax $d_2$ becomes 2.0 or more times larger than the parallax $d_1$, it is possible to attain the effect of suppression of lowering of the ranging accuracy for both the long distance end $E_1$ and the short distance end $E_2$ at the same time.

Figure 6:
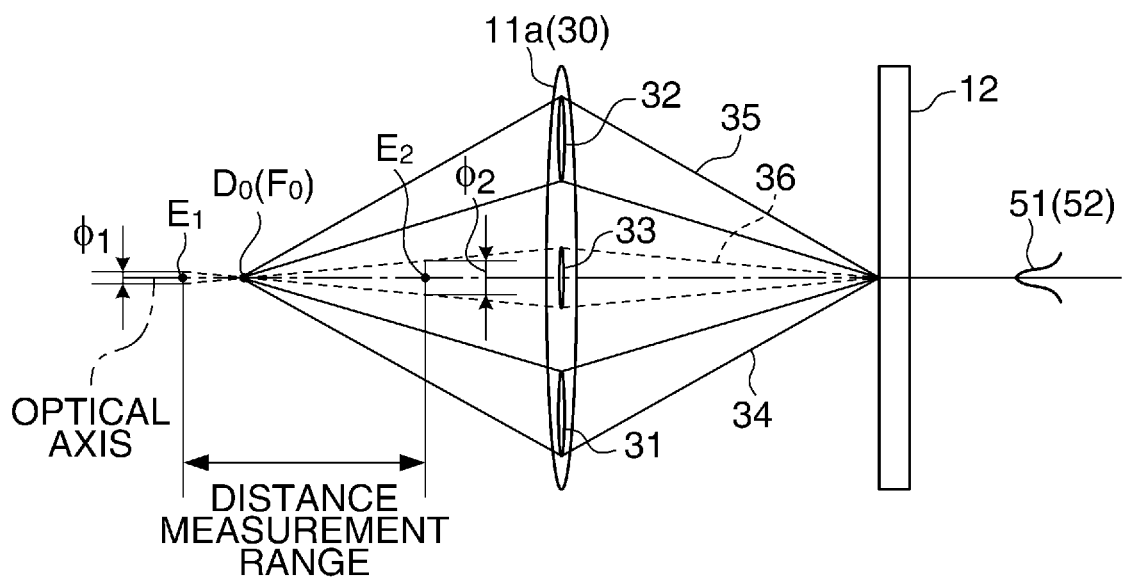
FIG. 6 is a diagram useful in explaining a case where the parallax 0 position displaced toward a long distance end of the distance measurement range coincides with an in-focus position.

FIG. 6 is a diagram useful in explaining a case where the parallax 0 position displaced toward the long distance end of the distance measurement range coincides with the in-focus position. Note that in FIG. 6, the ranging light fluxes 34 and 35 (indicated by solid lines in FIG. 6) having passed through the ranging pupils 31 and 32, respectively, and the image pickup light flux 36 (indicated by broken lines in FIG. 6) having passed through the image pickup pupil 33 are drawn as they are, for clarity. Further, a position on the optical axis which is optically conjugate to the image pickup device 12 with respect to the image pickup pupil 33 is set as the in-focus position $F_0$ of the camera 10. Furthermore, only the lens 11a is drawn as a representative of the optical system 11, and it is assumed for convenience's sake that the whole surface of the lens 11a forms the exit pupil 30.

In FIG. 6, the optical system 11 is configured such that the parallax 0 position $D_0$ coincides with the in-focus position $F_0$. At this time, the in-focus position $F_0$ as well is displaced toward the long distance end $E_1$, as a consequence. With this, a blur size (circle of confusion) $\Phi_1$ of an image formed from the image pickup light flux 36 of the object existing at the long distance end $E_1$ becomes smaller than a blur size $\Phi_2$ of an image formed from the image pickup light flux 36 of the object existing at the short distance end $E_2$. Note that the blur size $\Phi_1$ of the image at the long distance end $E_1$ is set such that it is smaller than a size of two pixels of the image pickup device 12. At this time, the size of the image pickup pupil 33 is determined such that the blur size $\Phi_2$ of the image at the short distance end $E_2$ becomes not larger than a maximum blur size allowable in the recognition processing.

The image of an object appears larger at a short distance than at a long distance, and hence the allowance of the blur size in the recognition processing is larger on the short distance side. Therefore, even when the blur size $\Phi_2$ of the image at the short distance end $E_2$ becomes larger than the blur size $\Phi_1$ of the image at the long distance end $E_1$, it is possible to suppress the lowering of the accuracy of the recognition processing.

Figure 7:
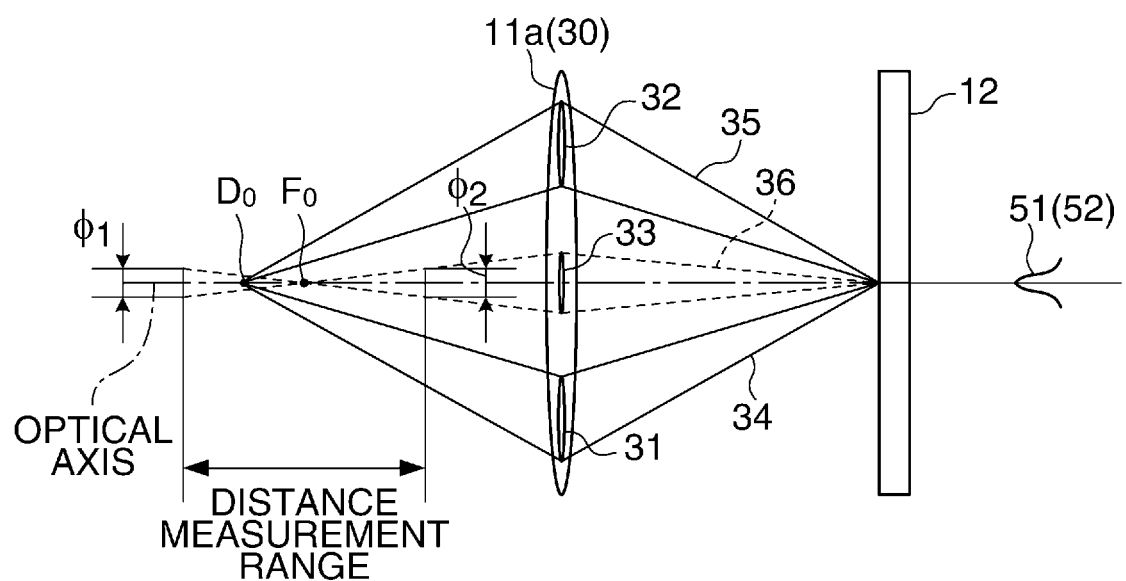
FIG. 7 is a diagram useful in explaining a case where the parallax 0 position displaced toward the long distance end of the distance measurement range does not coincide with an in-focus position.

FIG. 7 is a diagram useful in explaining a case where the parallax 0 position displaced toward the long distance end of the distance measurement range does not coincide with the in-focus position. Note that also in FIG. 7, the ranging light fluxes 34 and 35 (indicated by solid lines in FIG. 7) having passed through the ranging pupils 31 and 32, respectively, and the image pickup light flux 36 (indicated by broken lines in FIG. 7) having passed through the image pickup pupil 33 are drawn as they are, for clarity. Here as well, a position on the optical axis which is optically conjugate to the image pickup device 12 with respect to the image pickup pupil 33 is set as the in-focus position $F_0$ of the camera 10. Furthermore, only the lens 11a is drawn as a representative of the optical system 11, and it is assumed for convenience' sake that the whole surface of the lens 11a forms the exit pupil 30.

In FIG. 7, the optical system 11 is configured such that the in-focus position $F_0$ does not coincide with the parallax 0 position $D_0$, but is located about the midpoint between the long distance end $E_1$ and the short distance end $E_2$ of the distance measurement range. The non-coincidence between the in-focus position $F_0$ and the parallax 0 position $D_0$ is realized by intentionally changing the aberration of each of the lenses 11a and 11b. This makes it possible to set the blur size $\Phi_1$ of the image formed from the image pickup light flux 36 of the object existing at the long distance end $E_1$ to the same degree as the blur size $\Phi_2$ of the image formed from the image pickup light flux 36 of the object existing at the short distance end $E_2$. Further, the optical system 11 is set such that a ratio between image blur sizes at the opposite ends $E_1$ and $E_2$ of the distance measurement range becomes smaller than a ratio (parallax ratio) between the parallaxes $d_1$ and $d_2$ in respective cases where the object exists at the respective ends $E_1$ and $E_2$ of the distance measurement range. More specifically, the optical system 11 is set such that the blur size $\Phi_1$ of the image at the long distance end $E_1$ and the blur size $\Phi_2$ of the image at the short distance end $E_2$ satisfy the following expression:

$$d_2/d_1 > \text{Max}(\Phi_1,\Phi_2)/\text{Min}(\Phi_1,\Phi_2) \geq 1$$

wherein Max and Min represent a maximum value and a minimum value in parentheses, respectively.

As a consequence, it is possible to prevent the quality of an image of an object obtained in the distance measurement range from being largely reduced in one of the case where the object exists toward the long distance end $E_1$ and the case where the object exists toward the short distance end $E_2$. Further, the size of the image pickup pupil 33 can be made larger than in the case shown in FIG. 6, so that it is possible to obtain a picked-up image which is brighter and has less noise.

Figure 8A:
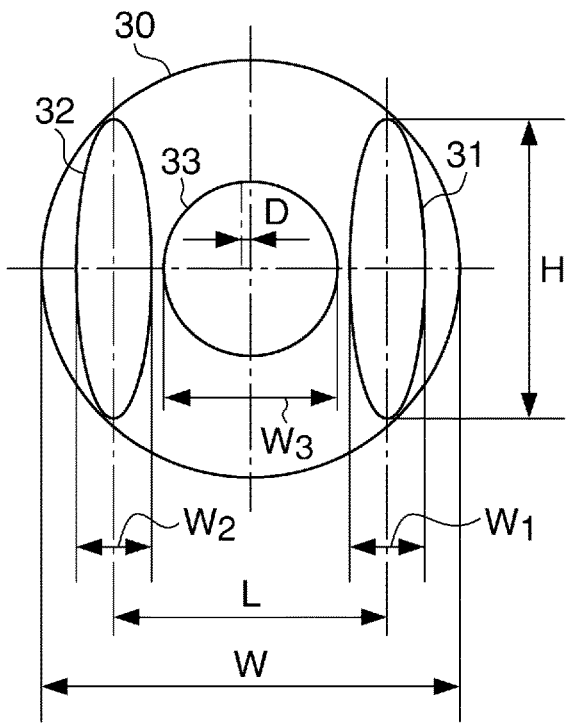
FIGS. 8A to 8C are diagrams of an exit pupil of an optical system according to the first embodiment.
Figure 8B:
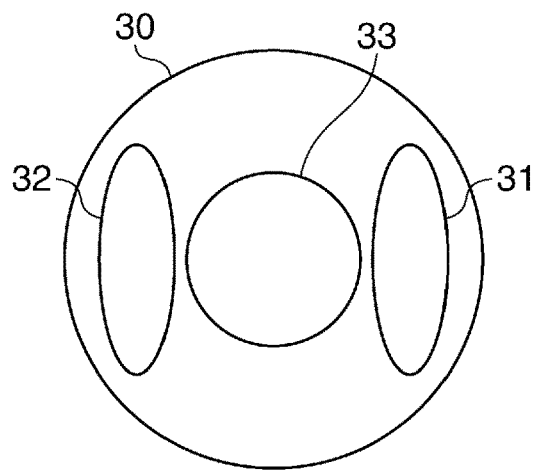
Figure 8C:
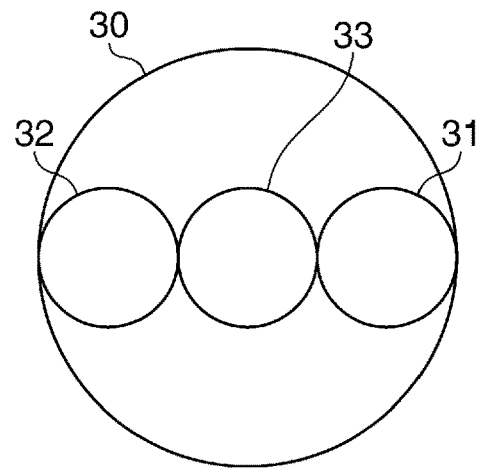

FIGS. 8A to 8C are diagrams of the exit pupil of the optical system according to the first embodiment. Note that a lateral direction as viewed in FIGS. 8A to 8C corresponds to the parallax direction.

In FIG. 8A, the exit pupil 30 includes the two elliptical ranging pupils 31 and 32 which are located opposite (preferably symmetrical) to each other in the parallax direction with respect to the center of the exit pupil 30 (the optical axis of the optical system 11) and also are located close to the opposite ends of the exit pupil 30 in the parallax direction, respectively. Further, the exit pupil 30 includes the image pickup pupil 33 having a perfect circular shape, which is located in a substantially central portion of the exit pupil 30 so as to be sandwiched between the ranging pupils 31 and 32 in the parallax direction, and also includes the optical axis of the optical system 11. A ratio of a distance L between the centers of gravity of the ranging pupils 31 and 32 in the parallax direction to an exit pupil width W as the length (diameter) of the exit pupil 30 in the parallax direction is not smaller than 0.6 and also not larger than 0.9. Further, a ratio of a distance D from the center of gravity of the image pickup pupil 33 to the optical axis of the optical system 11 in the parallax direction to the exit pupil width W is not smaller than 0 and also not larger than 0.05.

This makes it possible to cause the ranging pupil 31 and the ranging pupil 32 to be sufficiently spaced from each other in the parallax direction, thereby making it possible to increase a base line length. As a consequence, it is possible to enhance the accuracy of distance information of the object measured using the imaging plane phase difference method. Further, since the distance D is not larger than 0.05, it is possible to reduce displacement between the center of the image pickup light flux 36 and the optical axis. As a consequence, it is possible to make natural the blurring of a picked-up image obtained from the image pickup light flux 36, thereby making it possible to enhance the accuracy of image analysis and the like.

Further, a ratio of each of ranging pupil widths $W_1$ and $W_2$ (partial pupil widths) as the lengths of the respective ranging pupils 31 and 32 in the parallax direction to the exit pupil width W is not smaller than 0.1 and also not larger than 0.4. Furthermore, a ratio of an image pickup pupil width $W_3$ as the length of the image pickup pupil 33 in the parallax direction to the exit pupil width W is not smaller than 0.05 and also not larger than 0.4.

With this, it is possible to increase the degree of freedom in the arrangement of the ranging pupils 31 and 32 in the parallax direction while keeping small the ranging pupil widths $W_1$ and $W_2$. This makes it possible to locate the ranging pupils 31 and 32 close to the opposite ends of the exit pupil 30 in the parallax direction, whereby it is possible to positively increase the base line length. Further, if the ranging pupil widths $W_1$ and $W_2$ are made too small, the light amounts of the ranging light fluxes 34 and 35 are largely reduced to reduce the S/N (signal-to-noise) ratios of the obtained ranging image signals, which reduces the accuracy of a measured distance. However, as described above, since the ratio of each of the ranging pupil widths $W_1$ and $W_2$ to the exit pupil width W is not smaller than 0.1, it is possible to prevent large reduction of the light amounts of the ranging light fluxes 34 and 35. Further, if the ranging pupil widths $W_1$ and $W_2$ are made larger, i.e. if the ranging pupils 31 and 32 are made larger, the base line length is reduced to reduce the accuracy of a measured distance. However, as described above, since the ratio of each of the ranging pupil widths $W_1$ and $W_2$ to the exit pupil width W is not larger than 0.4, it is possible to prevent reduction of the base line length.

Further, the elliptical ranging pupils 31 and 32 each have long sides in a vertical direction (direction perpendicular to the parallax direction), as viewed in FIG. 8A. A ratio (hereinafter referred to as the "aspect ratio") of a ranging pupil height H as the length of each of the ranging pupils 31 and 32 in the vertical direction as viewed in FIG. 8A, to each of the ranging pupil widths $W_1$ and $W_2$ is not smaller than 1, and preferably is not smaller than 2. This makes it possible to increase the amounts of the ranging light fluxes 34 and 35 having passed through the respective ranging pupils 31 and 32. As a consequence, it is possible to increase the S/N ratios of the image signals obtained from the images formed by the ranging light fluxes 34 and 35, whereby it is possible to determine the distance information of the object with high accuracy.

Furthermore, the exit pupil 30 includes the image pickup pupil 33 sandwiched by the ranging pupils 31 and 32 in the parallax direction. A picked-up image of the object is formed from the image signal obtained by photoelectrically converting the image formed from the image pickup light flux 36 having passed through the image pickup pupil 33. As described hereinabove, the ratio of the image pickup pupil width $W_3$ of the image pickup pupil 33 to the exit pupil width W is not larger than 0.4. With this, compared with a case where fluxes having passed through the whole area of the exit pupil 30 are used, a diaphragm can be made smaller to increase a depth of focus, thereby making it possible to obtain a picked-up image of the object, which is suitable for the recognition processing. On the other hand, since the ratio of the image pickup pupil width $W_3$ of the image pickup pupil 33 to the exit pupil width W is not smaller than 0.05, it is possible to increase the S/N ratio of the image signal.

Note that the sizes and shapes of the ranging pupils 31 and 32 are set as desired insofar as the above-described restrictions on the ranging pupil widths $W_1$ and $W_2$ and the ranging pupil height H are followed. For example, as shown in FIG. 8B, the ranging pupils 31 and 32 may be somewhat smaller. Further, as shown in FIG. 8C, the ranging pupils 31 and 32 and the image pickup pupil 33 may have the same shape (perfect circular shape). However, the sizes of the ranging pupils 31 and 32 are required to be large enough to increase the intensities of the image signals formed based on the ranging light fluxes 34 and 35 having passed through the respective ranging pupils 31 and 32 to such a degree that accurate distance information of the object can be acquired. In short, it is preferable that the ranging pupil height H is as long as possible, and that it is longer than an image pickup height as the length of the image pickup pupil 33 in the vertical direction as viewed in FIG. 8A (for example, it is more preferable that the ranging pupil height H is 1.1 or more times as long as an image pickup pupil height).

Figure 9A:
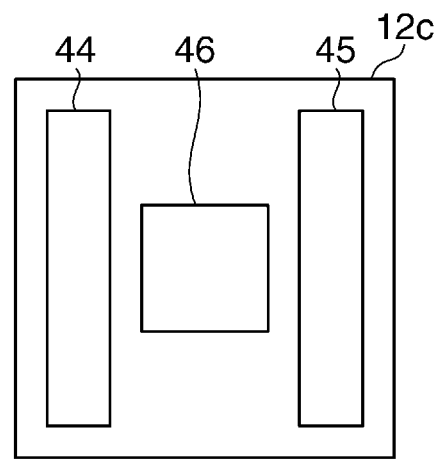
FIGS. 9A and 9B are diagrams useful in explaining the arrangement of PDs in imaging and ranging pixels.

As described hereinabove, the arrangement of each of the ranging pupils 31 and 32 is defined by the position and size of the light shielding film 40 of an associated one of the ranging pixels 12b, and the arrangement of the image pickup pupil 33 is defined by the position and size of the light shielding film 66 of the image pickup pixel 12a. Alternatively, the arrangements of the ranging pupils 31 and 32 and the image pickup pupil 33 are defined by the positions and sizes of the PDs 44 to 46 of the imaging and ranging pixel 12c. Therefore, in the imaging and ranging pixel 12c, as shown in FIG. 9A, the PDs 44 and 45 each have a rectangular shape having long sides in the vertical direction (direction perpendicular to the parallax direction), in association with the respective ranging pupils 31 and 32 which are vertically long. Further, the PDs 44 and 45 are arranged to be spaced away from each other in the parallax direction in association with the two ranging pupils 31 and 32 which are located close to the opposite ends of the exit pupil 30, respectively. Further, the PD 46 has a square shape in association with the image pickup pupil 33 having the perfect circular shape, and is arranged in the substantially central portion of the imaging and ranging pixel 12c in association with the image pickup pupil 33 located in the substantially central portion of the exit pupil 30. In a case where one imaging and ranging pixel 12c includes the PDs 44 and 45 as shown in FIG. 9A, image signals for calculating the parallax between a pair of images can be obtained from the one imaging and ranging pixel 12c, so that it is possible to obtain a large number of image signals. That is, it is possible to increase the resolution of the image signals. This makes it possible to enhance the image quality of a formed image. Further, it is possible to increase the resolution of distance information.

Figure 9B:
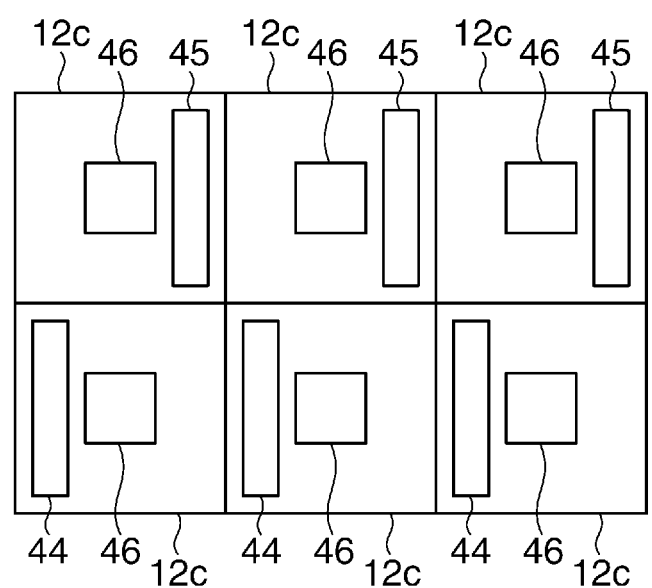

Note that the imaging and ranging pixel 12c may include only one of the PD 44 and the PD 45. For example, as shown in FIG. 9B, one imaging and ranging pixel 12c (lower one as viewed in FIG. 9B) includes the PD 44, and another imaging and ranging pixel 12c (upper one as viewed in FIG. 9B) includes the PD 45. In this case, the ranging light flux 34 having passed through the ranging pupil 31 is received by the PD 44 of the one imaging and ranging pixel 12c, and the PD 44 outputs an image signal obtained by photoelectrically converting an image formed from the ranging light flux 34. Also, the ranging light flux 35 having passed through the ranging pupil 32 is received by the PD 45 of the other imaging and ranging pixel 12c, and the PD 45 outputs an image signal obtained by photoelectrically converting an image formed from the ranging light flux 35. Further, the parallax between a pair of images is calculated from the image signals output from the PD 44 of the one imaging and ranging pixel 12c and the PD 45 of the other imaging and ranging pixel 12c. As shown in FIG. 9B, in the case where the imaging and ranging pixel 12c includes only one of the PD 44 and the PD 45, it is possible to reduce the number of the PDs included in the one imaging and ranging pixel 12c to two. This makes it possible to leave room for arranging the PDs, whereby it is possible to increase the sizes of the PDs. As a consequence, it is possible to increase the amounts of light received by the PDs to improve the sensitivities of the PDs. This makes it possible to enhance the image quality of an image formed even in an environment where the amount of light is insufficient, whereby it is possible to improve the accuracy of calculation of the distance to the object.

Figure 10A:
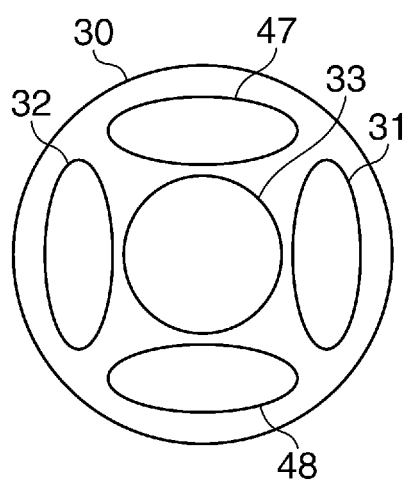
FIGS. 10A and 10B are diagrams useful in explaining a variation of the exit pupil of the optical system, and a variation of the arrangement of PDs in an imaging and ranging pixel.
Figure 10B:
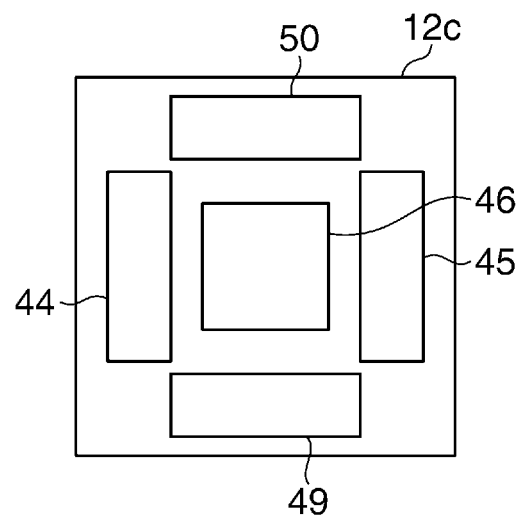

Although in the present embodiment, the exit pupil 30 includes the ranging pupils 31 and 32 arranged in the lateral direction as viewed in the figures, the exit pupil 30 may further include two more ranging pupils arranged in the vertical direction as viewed in the figures. For example, as shown in FIG. 10A, the exit pupil 30 includes two elliptical ranging pupils 47 and 48 arranged in the vertical direction as viewed in FIG. 10A in addition to the ranging pupils 31 and 32. The ranging pupils 47 and 48 are located close to the opposite ends of the exit pupil 30 in the vertical direction as viewed in FIG. 10A, respectively. This makes it possible to calculate not only the parallax between the pair of images in the lateral direction as viewed in FIG. 10A, but also the parallax between a pair of images in the vertical direction as viewed in FIG. 10A, whereby it is possible to improve the accuracy of measurement of a distance to a lateral line or an oblique line in the object. In this case, as shown in FIG. 10B, the imaging and ranging pixel 12c includes PDs 49 and 50 each having a rectangular shape having long sides in the lateral direction as viewed in FIG. 10B in association with the respective elliptical ranging pupils 47 and 48. Further, the PDs 49 and 50 are arranged to be spaced away from each other in the vertical direction as viewed in FIG. 10B in association with the ranging pupils 47 and 48 located close to the opposite ends of the exit pupil 30 in the vertical direction, respectively.

Further, in the present embodiment, each image pickup pixel 12a has a primary color filter, and hence an image formed from the image pickup light flux 36 received by the image pickup pixel 12a is a color image. Note that the color filter of the image pickup pixel 12a may be not the primary color filter but a complementary color filter. The complementary color filter passes a larger amount of light flux therethrough than the primary color filter, and hence it is possible to improve the sensitivity of the PD 42. On the other hand, in the ranging pixel 12b, the light flux received by the PD 38 is limited to a light flux having passed through the opening 39, and in the imaging and ranging pixel 12c, the sizes of the PDs 44 and 45 are limited. However, the ranging pixel 12b and the imaging and ranging pixel 12c include no color filters or include complementary color filters. With this, the amounts of light received by the PD 38 and the PDs 44 and 45 are not largely limited, and therefore, it is possible to prevent large reduction of the sensitivities of the PD 38 and the PDs 44 and 45. In the case where the ranging pixel 12b and the imaging and ranging pixel 12c include no color filters, a pair of images formed from the ranging light fluxes 34 and 35 received by the ranging pixel 12b and the imaging and ranging pixel 12c are monochrome images.

Next, a description will be given of a second embodiment of the present invention. In the second embodiment of the present invention, the above-described ranging apparatus according to the first embodiment is applied to an automotive vehicle as a moving object.

Figure 11:
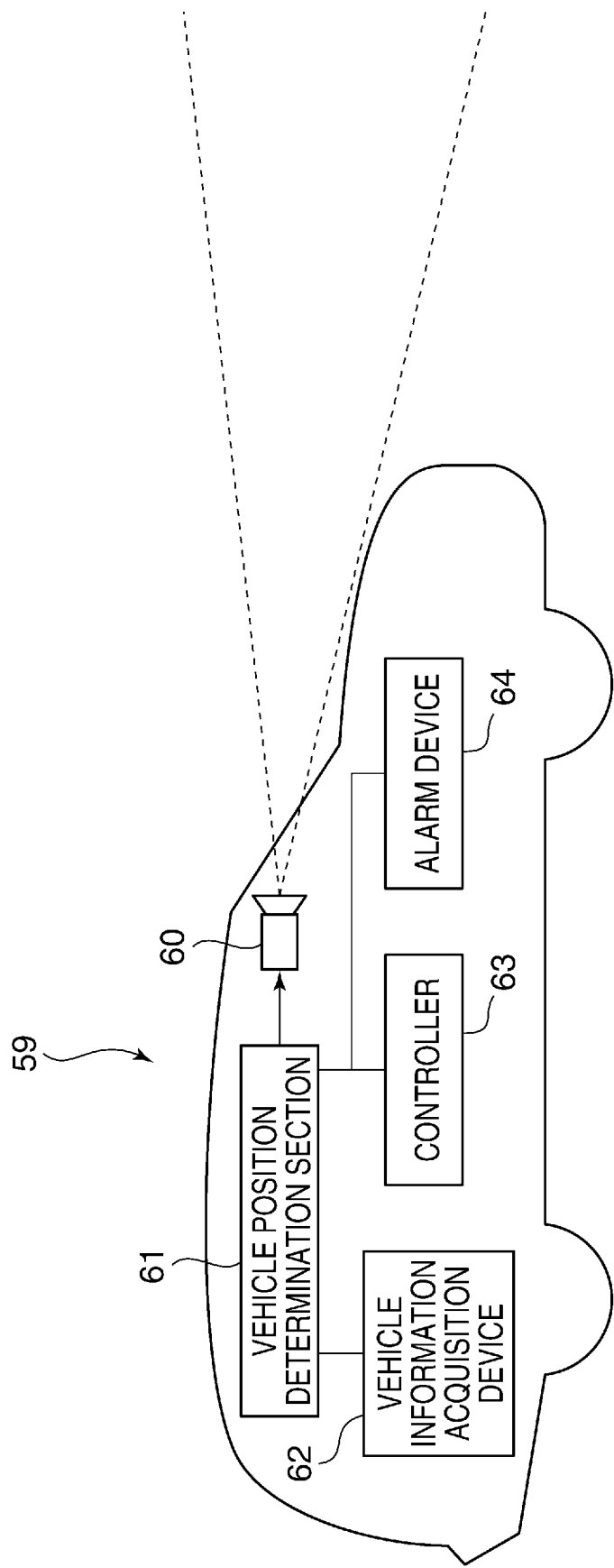
FIG. 11 is a schematic diagram showing a state in which a driving assistance system is installed on an automotive vehicle as a moving object according to a second embodiment of the present invention.
Figure 12:
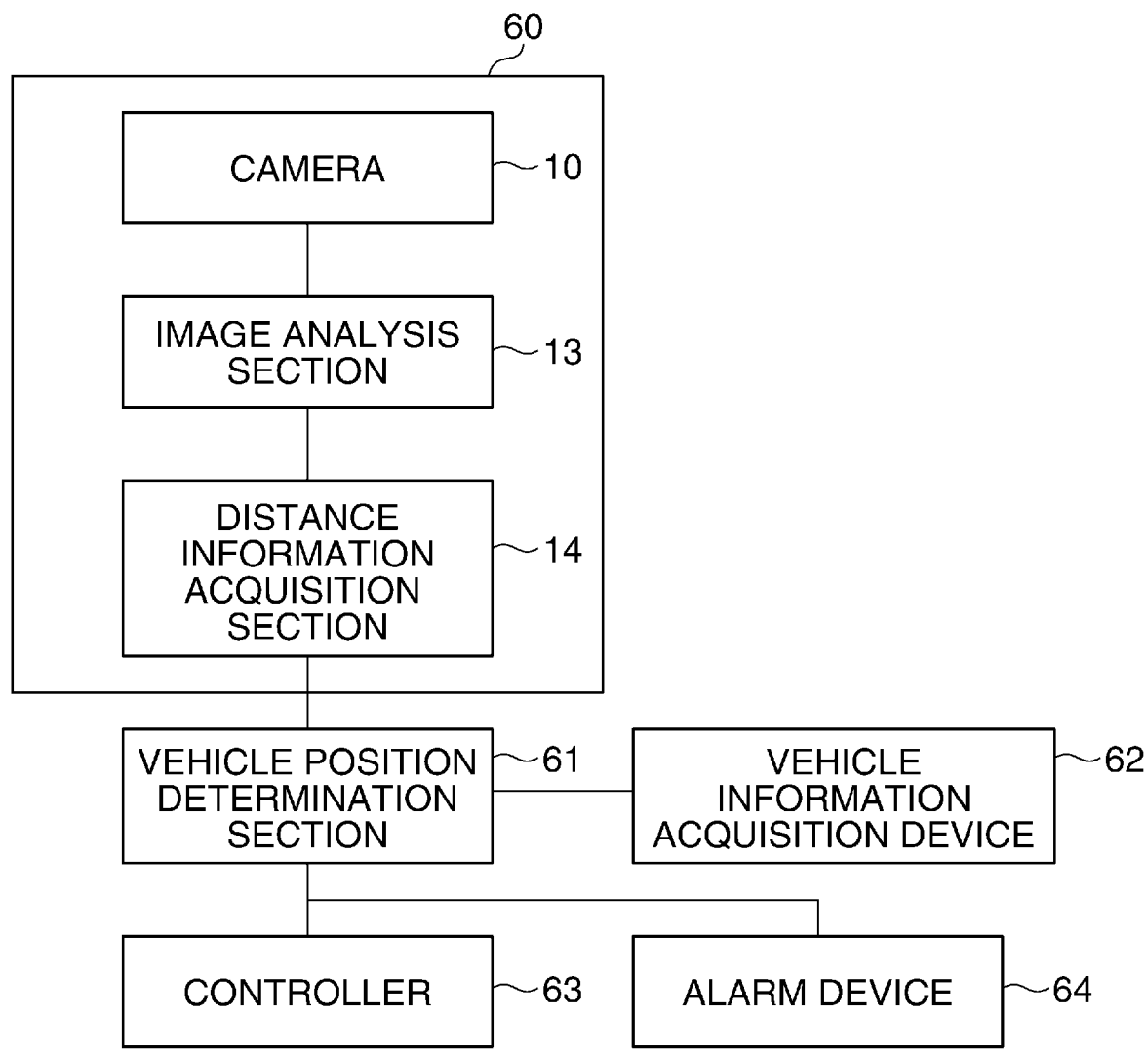
FIG. 12 is a diagram of the driving assistance system for the automotive vehicle as the moving object according to the second embodiment.

FIG. 11 is a schematic diagram showing a state in which a driving assistance system is installed on an automotive vehicle as a moving object according to the present embodiment, and FIG. 12 is a diagram of the driving assistance system.

Referring to FIGS. 11 and 12, the vehicle 59 is provided with a ranging apparatus 60 including the camera 10, the image analysis section 13, and the distance information acquisition section 14, and a vehicle position determination section 61. The vehicle position determination section 61 determines a relative position of the vehicle 59 with respect to a preceding vehicle, based on a ranging result calculated by the ranging apparatus 60, e.g. a distance to the preceding vehicle. Note that the image analysis section 13, the distance information acquisition section 14, and the vehicle position determination section 61 can be installed both as software (programs) and as hardware or may be installed as a combination of software and hardware. For example, processing of each section may be realized by storing a program in a memory of a computer (a microcomputer, an FPGA (field-programmable gate array) or the like) incorporated in the camera 10, and causing the program to be executed by the computer. Further, a dedicated processor, such as an ASIC (Application Specific Integrated Circuit), for realizing all or part of the processing of each section using a logic circuit, may be provided.

Further, the vehicle 59 includes a vehicle information acquisition device 62 (moving object information acquisition device), a controller 63, and a alarm device 64. The vehicle position determination section 61 is connected to the vehicle information acquisition device 62, the controller 63, and the alarm device 64. The vehicle position determination section 61 acquires at least one of a vehicle speed (speed), a yaw rate, and a rudder angle of the vehicle 59 as vehicle information (information of the moving object) from the vehicle information acquisition device 62. The controller 63 controls the vehicle 59 based on a result of determination by the vehicle position determination section 61. The alarm device 64 issues an alarm based on a result of determination by the vehicle position determination section 61. The controller 63 is e.g. an ECU (Engine Control Unit). For example, in a case where there is a high possibility that the vehicle 59 collides with a preceding vehicle, as a result of determination by the vehicle position determination section 61, the controller 63 performs vehicle control for avoiding collision or reducing damages, by braking the vehicle 59, releasing an accelerator pedal, suppressing an engine output, or the like. Further, e.g. in the case where there is a high possibility that the vehicle 59 collides with a preceding vehicle, the alarm device 64 warns a driver e.g. by sounding an alarm, displaying alarm information on a screen of a car navigation system, and vibrating a sheet belt or the steering wheel. In the present embodiment, the camera 10 of the ranging apparatus 60 picks up an image around the vehicle 59, e.g. forward or backward of the vehicle 59. Note that the controller 63 may be configured to control the vehicle 59 based on not only a result of ranging by the ranging apparatus 60 but also vehicle information acquired by the vehicle information acquisition device 62. Note that, as an engine of the vehicle 59, there may be used an internal combustion engine that uses gasoline or light oil as fuel or a motor operated by electricity.

FIG. 13 is a flowchart of a collision avoidance process performed by the driving assistance system according to the present embodiment. Hereinafter, a detailed description will be given of the operations by the respective sections of the driving assistance system, by describing the collision avoidance process.

First, in a step S1, image signals of a plurality of images (e.g. the first to third mages) are acquired using the camera 10. Next, in a step S2, vehicle information is acquired from the vehicle information acquisition device 62. The vehicle information acquired in the step S2 is information including at least one of the vehicle speed, yaw rate, and rudder angle of the vehicle 59. Then, in a step S3, feature analysis (recognition processing) is performed on at least one of the plurality of acquired image signals. More specifically, the image analysis section 13 analyzes feature amounts, such as the edge amount, edge direction, density value, color, luminance value of each image signal, to thereby recognize (detect) an object (automotive vehicle, bicycle, pedestrian, traffic lane, guardrail, brake lamp, etc.). Note that the feature amount analysis may be performed on each of the plurality of image signals, or on one or some of the plurality of image signals (e.g. only the image signal of the third image).

In the following step S4, the parallax between a pair of images (e.g. the first and second images) picked up by the camera 10 is calculated by the distance information acquisition section 14, whereby distance information of an object existing in the picked-up images is acquired. The acquisition of the distance information is performed by the distance information acquisition section 14. Note that in the present embodiment, a detailed description of the method of calculating the parallax is omitted since the SSDA (Sequential Similarity Detection Algorithm) method, the area correlation method, and so forth, already exist as known techniques. Further, the steps S2, S3, and S4 may be performed by executing the steps in the above-mentioned order or by executing the steps in parallel. Here, a distance to an object existing in the picked-up images, and a defocus amount thereof can be calculated from the parallax calculated in the step S4, and internal and external parameters of the camera 10.

Then, in a step S5, it is determined whether or not the acquired distance information is within a predetermined setting, i.e. whether or not there is an obstacle within a set distance, whereby it is determined whether or not there is a possibility of a forward or backward collision. In a case where there is an obstacle within the set distance, it is determined that there is a possibility of a collision, and the controller 63 causes the vehicle 59 to perform an avoidance operation (step S6). More specifically, the possibility of a collision is notified to the controller 63 and the alarm device 64. At this time, the controller 63 controls at least one of the direction of the movement of the vehicle 59 and the speed of the movement thereof. For example, the controller 63 avoids the collision with a preceding vehicle and reduces the possibility of the collision by braking the vehicle 59, i.e. by generating and outputting a control signal for generating a braking force on each of the wheels of the vehicle 59, and suppressing the output of the engine. Further, the alarm device 64 notifies a user of a danger using a sound, a video or a vibration. After that, the present process is terminated. On the other hand, in a case where there is no obstacle within the set distance, it is determined that there is no possibility of a collision, followed by terminating the present process.

According to the collision avoidance process in FIG. 13, it is possible to effectively detect an obstacle. That is, it is possible to accurately detect an obstacle, to thereby avoid a collision with the obstacle and reduce damages.

Although in the present embodiment, the description has been given of the collision avoidance based on distance information, it is possible to apply the present invention to a vehicle which runs following a preceding vehicle, maintains the vehicle position in the center of a lane, or suppresses deviation from the lane, based on distance information. Further, the present invention can be applied not only to the driving assistance of the vehicle 59 but also to the autonomous driving of the vehicle 59. Furthermore, the ranging apparatus 60 of the present invention can be applied not only to vehicles, such as automotive vehicles, but also to moving objects, such as boats, aircrafts, drones, or industrial robots. Further, the ranging apparatus 60 of the present invention can be applied not only to the moving objects but also to a wide range of apparatuses making use of object recognition, such as apparatuses used in intersection monitoring systems and intelligent transport systems (ITS). For example, the present invention may be applied to intersection monitoring cameras as non-moving objects in the intersection monitoring systems.

Although in the above-described first embodiment, the distance measurement range is set to 1 to 100 m or 2 to 50 m, it may be set e.g. to 100 to 150 m. Although in the above-described first embodiment, the distance measurement range acquires the first to third images, the ranging apparatus may be configured not to acquire the third image without being provided with the image pickup pixels 12a or the PDs 46. In this case, the image analysis section 13 performs the feature amount analysis on the first and second images.

Further, the imaging and ranging pixel 12c shown in FIG. 9A may be configured to output the image signal from the PD 44 and the image signal from the PD 45, respectively. Note that the image signal from the PD 44 is a signal of the first image based on the ranging light flux 34 having passed through the ranging pupil 31, and is hereinafter simply referred to as the "first image signal". Further, the image signal from the PD 45 is a signal of the second image based on the ranging light flux 35 having passed through the ranging pupil 32, and is hereinafter simply referred to as the "second image signal". Alternatively, the imaging and ranging pixel 12c may be configured to output the first image signal and an image signal obtained by adding the image signal from the PD 44 and the image signal from the PD 45. The image signal obtained by adding the image signal from the PD 44 and the image signal from the PD 45 is a signal of a fourth image based on a light flux having passed through the ranging pupil 31 and a light flux having passed through the ranging pupil 32, and is hereinafter simply referred to as the "fourth image signal". In this case, the second image signal can be calculated by calculating a difference between the first image signal and the fourth image signal using the distance information acquisition section 14.

Figure 14A:
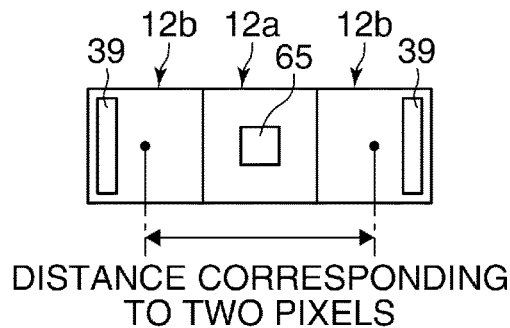
FIGS. 14A to 14D are diagrams useful in explaining a distance corresponding to two pixels as a maximum value of parallax in a case where an object exists at a long distance end.
Figure 14B:
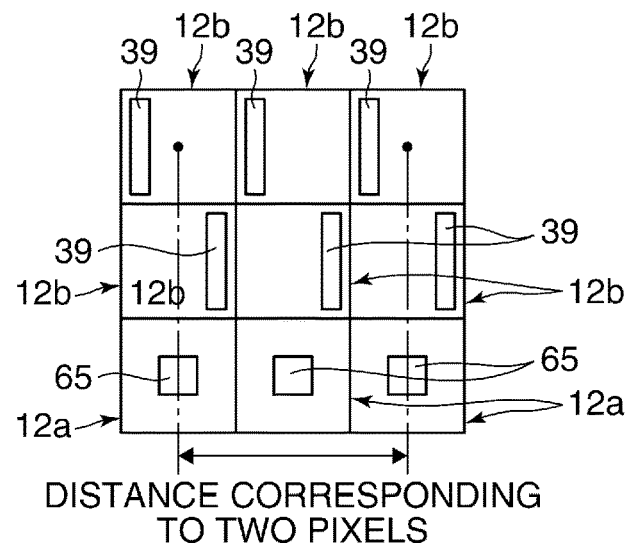
Figure 14C:
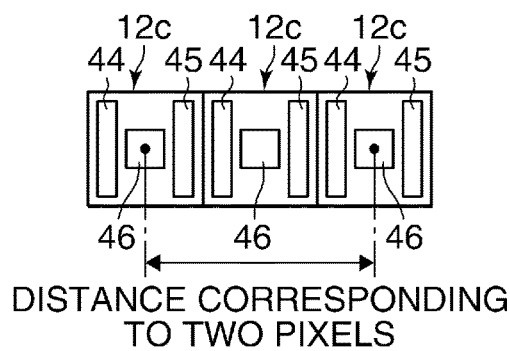
Figure 14D:
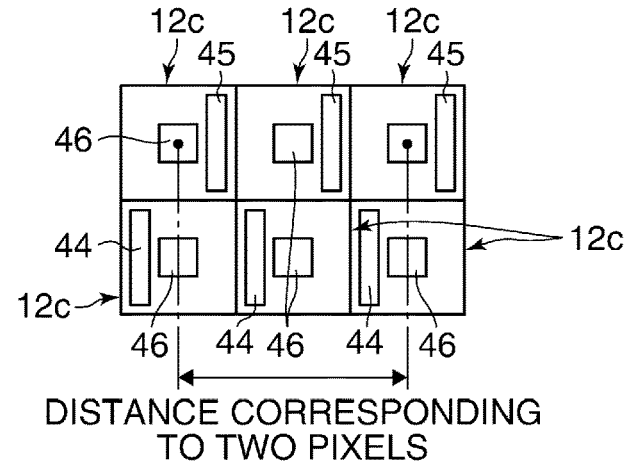

In the above-described first embodiment, the parallax $d_1$ in the case where the object exists at the long distance end $E_1$ becomes shorter than the parallax $d_2$ in the case where the object exists at the short distance end $E_2$. Particularly, from the viewpoint of suppressing the lowering of the ranging accuracy, it is more preferable, as the parallax $d_1$ in the case where the object exists at the long distance end $E_1$ is smaller. Therefore, it is preferable, for example, that the parallax $d_1$ in the case where the object exists at the long distance end $E_1$ is set to be smaller than a distance corresponding to two pixels in the image pickup device 12. Here, the distance corresponding to two pixels corresponds, in a case where distance measurement is performed using image signals formed by a pair of two ranging pixels 12b, respectively, to a center-to-center distance between the pair of two ranging pixels 12b sandwiching the image pickup pixel 12a therebetween (FIG. 14A). Furthermore, the method of arranging the respective ranging pixels 12b is not limited to the one shown in FIG. 3B, but for example, as shown in FIG. 14B, a method of arranging the ranging pixels 12b without sandwiching the image pickup pixel 12a therebetween can be realized. In this case, the distance corresponding to two pixels corresponds to a center-to-center distance between two ranging pixels 12b disposed respectively at the opposite ends of a pixel row formed by three ranging pixels 12b arranged in the parallax direction. Further, in a case where distance measurement is performed using a pair of image signals formed by one imaging and ranging pixel 12c, the distance corresponding to two pixels corresponds to a center-to-center distance between two imaging and ranging pixels 12c disposed respectively at the opposite ends of a pixel row formed by three ranging pixels 12c arranged in the parallax direction (FIGS. 14C and 14D).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-050237 filed Mar. 14, 2016 and No. 2017-031363 filed Feb. 22, 2017, which are hereby incorporated by reference herein in their entirety.

What is claimed is:

1. A ranging apparatus comprising:
   an optical system that includes a plurality of optical lenses which are fixed so as to implement a fixed focal length;
   an image pickup device that receives light fluxes from the optical system; and
   a distance information acquisition unit that is configured to acquire distance information based on image signals from the image pickup device,
   wherein the distance information acquisition unit acquires the distance information on an object, based on parallax in a first direction between (a) a first image based on a first light flux from an object, having passed through a first region of an exit pupil of the optical system, and (b) a second image based on a second light flux from the object, having passed through a second region of the exit pupil,
   wherein the optical system is configured such that the parallax of an object existing at a distance of 100 m from the ranging apparatus is smaller than the parallax of an object existing at a distance of 1 m from the ranging apparatus,
   wherein the image pickup device includes (a) a plurality of micro lenses positioned at an image surface of the optical system and (b) pixels corresponding respectively to the micro lenses, and
   wherein each of the pixels includes (a) an image pickup photodiode, and (b) a ranging photodiode or ranging photodiodes paired for parallax.

2. The ranging apparatus according to claim 1, wherein the optical system is configured such that the parallax of an object existing at a distance of 50 m from the ranging apparatus is smaller than the parallax of an object existing at a distance of 2 m from the ranging apparatus.

3. The ranging apparatus according to claim 1, wherein the optical system is configured such that the parallax of the object existing at a distance of 100 m from the ranging apparatus is smaller than a distance corresponding to two pixels in the image pickup device.

4. The ranging apparatus according to claim 1, wherein the optical system is configured such that the parallax of an object existing at a distance of 1 m from the ranging apparatus is 1.2 or more times as large as the parallax of an object existing at a distance of 100 m from the ranging apparatus.

5. The ranging apparatus according to claim 1, wherein the optical system is configured such that the parallax of an object existing at a distance of 1 m from the ranging apparatus is 2.0 or more times as large as the parallax of an object existing at a distance of 100 m from the ranging apparatus.

6. The ranging apparatus according to claim 1, wherein a ratio of a distance between a center of gravity of the first region and a center of gravity of the second region to a length of the exit pupil in a parallax direction is not smaller than 0.6 and also not larger than 0.9.

7. The ranging apparatus according to claim 1, wherein a ratio of each of lengths of the first region and the second region in a parallax direction to a length of the exit pupil in the parallax direction is not smaller than 0.1 and also not larger than 0.4.

8. The ranging apparatus according to claim 1, further comprising an image analysis unit configured to analyze a third image based on a light flux from the object, having passed through a third region of the exit pupil.

9. The ranging apparatus according to claim 8, wherein the optical system is configured such that a blur size $\Phi_1$ of an image of the object existing at the distance of 100 m from the ranging apparatus, formed from the light flux having passed through the third region, and a blur size $\Phi_2$ of an image of the object existing at the distance of 1 m from the ranging apparatus, formed from the light flux having passed through the third region satisfy the following equation:

$$d_2/d_1 > \text{Max}(\Phi_1, \Phi_2)/\text{Min}(\Phi_1, \Phi_2) \geq 1$$

wherein Max and Min represent a maximum value and a minimum value in parentheses, respectively, $d_1$ represents the parallax of the object existing at the distance of 100 m from the ranging apparatus, and $d_2$ represents the parallax of the object existing at the distance of 1 m from the ranging apparatus.

10. The ranging apparatus according to claim 8, wherein the third region includes an optical axis of the optical system, and
wherein the first region and the second region do not include the optical axis, and are located opposite to each other with respect to the optical axis.

11. The ranging apparatus according to claim 8, wherein a ratio of a distance from a center of gravity of the third region to the optical axis of the optical system to a length of the exit pupil in a parallax direction is not smaller than 0 and also not larger than 0.05.

12. The ranging apparatus according to claim 8, wherein a ratio of a length of the third region in a parallax direction to a length of the exit pupil in the parallax direction is not smaller than 0.05 and also not larger than 0.4.

13. The ranging apparatus according to claim 1, wherein a number of ranging photodiodes in each of the pixels is one,
wherein a ranging photodiode in one pixel among the pixels outputs a first image signal based on the first light flux made to pass through a first ranging partial pupil of the optical system,
wherein a ranging photodiode in another pixel among the pixels outputs a second image signal based on the second light flux made to pass through a second ranging partial pupil of the optical system, and
wherein the first ranging partial pupil and the second ranging partial pupil are positioned close to opposite ends of the exit pupil in the first direction.

14. The ranging apparatus according to claim 1, wherein a number of ranging photodiodes in each of the pixels is a plural number,
wherein, in each of the pixels, (a) a first ranging photodiode outputs a first image signal generated based on the first light flux made to pass through a first ranging partial pupil of the optical system, and (b) a second ranging photodiode outputs a second image signal generated based on the second light flux made to pass through a second ranging partial pupil of the optical system, and
wherein the first ranging partial pupil and the second ranging partial pupil are positioned close to opposite ends of the exit pupil in the first direction.

15. The ranging apparatus according to claim 14, wherein the distance information acquisition unit further acquires another distance information on the object, based on parallax in a second direction,
wherein, in each of the pixels, (a) a third ranging photodiode outputs a third image signal generated based on a third light flux made to pass through a third ranging partial pupil of the optical system and (b) a fourth ranging photodiode outputs a fourth image signal generated based on a fourth light flux made to pass through a fourth ranging partial pupil of the optical system, and
wherein the third ranging partial pupil and the fourth ranging partial pupil are positioned close to opposite ends of the exit pupil in the second direction.

16. A ranging apparatus comprising:
an optical system that includes a plurality of optical lenses which are fixed so as to implement a fixed focal length;
an image pickup device that receives light fluxes from the optical system; and
a distance information acquisition unit that is configured to acquire distance information based on image signals from the image pickup device,
wherein the distance information acquisition unit acquires the distance information on an object, based on parallax in a first direction between (a) a first image based on a first light flux from an object, having passed through a first region of an exit pupil of the optical system, and (b) a second image based on a second light flux from the object, having passed through a second region of the exit pupil,
wherein the optical system is configured such that the parallax of an object existing at a first end of a distance measurement range of the ranging apparatus is smaller than the parallax of an object existing at a second end of the distance measurement range of the ranging apparatus,
wherein the first end of the distance measurement range is positioned further from the optical system than the second end of the distance measurement range,
wherein the image pickup device includes (a) a plurality of micro lenses positioned at an image surface of the optical system and (b) pixels corresponding respectively to the micro lenses, and
wherein each of the pixels includes (a) an image pickup photodiode, and (b) a ranging photodiode or ranging photodiodes paired for parallax.

17. The ranging apparatus according to claim 16, wherein the optical system is configured such that the parallax of the object existing at the first end is smaller than a distance corresponding to two pixels in the image pickup device.

18. The ranging apparatus according to claim 17, further comprising an image analysis unit configured to analyze a third image based on a light flux from the object, having passed through a third region of the exit pupil.

19. The ranging apparatus according to claim 18, wherein the optical system is configured such that a blur size $\Phi_1$ of an image of the object existing at the first end, formed from the light flux having passed through the third region, and a blur size $\Phi_2$ of an image of the object existing at the second end, formed from the light flux having passed through the third region satisfy the following equation:

$$d_2/d_1 > \mathrm{Max}(\Phi_1,\Phi_2)/\mathrm{Min}(\Phi_1,\Phi_2) \geq 1$$

wherein Max and Min represent a maximum value and a minimum value in parentheses, respectively, $d_1$ represents the parallax of the object existing at the first end, and $d_2$ represents the parallax of the object existing at the second end.

20. The ranging apparatus according to claim 16, wherein the optical system is configured such that the parallax of the object existing at the second end of the distance measurement range is 1.2 or more times as large as the parallax of the object existing at the first end of the distance measurement range.

21. The ranging apparatus according to claim 16, wherein the optical system is configured such that the parallax of the object existing at the second end of the distance measurement range is 2.0 or more times as large as the parallax of the object existing at the first end of the distance measurement range.

22. A moving object including:
a ranging apparatus; and
a controller that controls the moving object based on a result of ranging by the ranging apparatus,
wherein the ranging apparatus comprises:
(1) an optical system that includes a plurality of optical lenses which are fixed so as to implement a fixed focal length;
(2) an image pickup device that receives light fluxes from the optical system; and (3) a distance information acquisition unit that is configured to acquire distance information based on image signals from the image pickup device, wherein the distance information acquisition unit acquires the distance information on an object, based on parallax in the first direction between (a) a first image based on a first light flux from an object, having passed through a first region of an exit pupil of the optical system, and (b) a second image based on a second light flux from the object, having passed through a second region of the exit pupil, wherein the optical system is configured such that the parallax of an object existing at a first end of a distance measurement range of the ranging apparatus is smaller than the parallax of an object existing at a second end of the distance measurement range of the ranging apparatus, wherein the first end of the distance measurement range is positioned further from the optical system than the second end of the distance measurement range, wherein the image pickup device includes (a) a plurality of micro lenses positioned at an image surface of the optical system and (b) pixels corresponding respectively to the micro lenses, and wherein each of the pixels includes (a) an image pickup photodiode, and (b) a ranging photodiode or ranging photodiodes paired for parallax.

23. The moving object according to claim 22, wherein the distance information acquisition unit of the ranging apparatus acquires distance information of an obstacle, wherein an image analysis unit of the ranging apparatus acquires feature information of the obstacle by analyzing an image of the obstacle, and wherein the controller controls the moving object based on the distance information and the feature information of the obstacle.

24. The moving object according to claim 22, further comprising a moving object information acquisition device, wherein the controller controls at least one of a direction of movement of the moving object and a speed of the movement of the moving object based on information on the moving object and the result of ranging by the ranging apparatus.

25. The moving object according to claim 22, wherein when it is determined that there is a possibility of the moving object colliding with an obstacle, the controller controls at least one of a direction of movement of the moving object and a speed of the movement of the moving object.

* * * * *